(12) United States Patent
Cheung et al.

(10) Patent No.: US 8,061,611 B2
(45) Date of Patent: Nov. 22, 2011

(54) BARCODE PATTERN

(75) Inventors: Eric Lap Min Cheung, Epping (AU); Stephen Farrar, Telopea (AU); Nicole Ai Ling Lam, Lane Cove (AU)

(73) Assignee: Canon Kabushiki Kaisha, Tokyo (JP)

( * ) Notice: Subject to any disclaimer, the term of this patent is extended or adjusted under 35 U.S.C. 154(b) by 601 days.

(21) Appl. No.: 11/949,192

(22) Filed: Dec. 3, 2007

(65) Prior Publication Data

US 2008/0149714 A1 Jun. 26, 2008

(30) Foreign Application Priority Data

Dec. 22, 2006 (AU) ............................. 2006252239

(51) Int. Cl.
*G06K 7/10* (2006.01)
(52) U.S. Cl. ............................................. 235/454
(58) Field of Classification Search ............... 235/379, 235/380, 492, 454, 462.01, 494
See application file for complete search history.

(56) References Cited

U.S. PATENT DOCUMENTS

| | | | | |
|---|---|---|---|---|
| 5,223,701 | A | 6/1993 | Batterman et al. | 235/494 |
| 6,032,861 | A | 3/2000 | Lemelson et al. | 235/456 |
| 6,058,498 | A | 5/2000 | Nagasaki et al. | 714/752 |
| 6,502,756 | B1 | 1/2003 | Fåhraeus | 235/494 |
| 6,663,008 | B1 | 12/2003 | Pettersson et al. | 235/494 |
| 7,048,198 | B2 | 5/2006 | Ladas et al. | 235/494 |
| 2002/0150276 | A1 | 10/2002 | Chang | 382/100 |
| 2006/0261175 | A1* | 11/2006 | Angelucci et al. | 235/494 |
| 2007/0023523 | A1* | 2/2007 | Onishi | 235/454 |
| 2010/0096458 | A1 | 4/2010 | Pettersson et al. | 235/454 |

FOREIGN PATENT DOCUMENTS

| | | |
|---|---|---|
| JP | 5-19694 A | 1/1993 |
| JP | 2003-511761 A | 3/2003 |
| JP | 2005-037990 A | 2/2005 |
| JP | 2005-301656 A | 10/2005 |
| WO | 01/26034 A1 | 4/2001 |
| WO | 2004/084125 A1 | 9/2004 |

* cited by examiner

*Primary Examiner* — Seung Lee
(74) *Attorney, Agent, or Firm* — Fitzpatrick, Cella, Harper & Scinto

(57) ABSTRACT

A method of encoding information in a document using a plurality of marks (104), the information comprising first data and second data, the method comprising the steps of encoding the first data using a first plurality of arrays of modulated marks disposed in a corresponding first plurality of tiles (610) spaced apart from each other at a first repeat rate (660); and encoding the second data using a second plurality of arrays of modulated marks disposed in a corresponding second plurality of tiles (680) spaced apart from each other at a second repeat rate (670); wherein: the second repeat rate is different to the first repeat rate; and the second plurality of tiles are embedded within the first plurality of tiles.

8 Claims, 29 Drawing Sheets

THIS PAGE HAS BEEN LEFT INTENTIONALLY BLANK

Fig. 12

THIS PAGE HAS BEEN LEFT INTENTIONALLY BLANK

Fig. 14

THIS PAGE HAS BEEN LEFT INTENTIONALLY BLANK

Fig. 15

BARCODE PATTERN

FIELD OF INVENTION

The current invention relates to computer readable marks on printed pages and in particular to computer readable marks with a high data density and with low visibility to the human eye.

BACKGROUND

Computer readable marks on printed pages are commonplace, with some varieties such as the common bar code being widely used, this approach offering 30 to 60 bits of data storage. The common barcode also consumes a not insignificant amount of space on a document page. Furthermore, the common bar code is typically clearly visible to a person looking at the page.

SUMMARY OF THE INVENTION

It is an object of the present invention to substantially overcome, or at least ameliorate, one or more disadvantages of existing arrangements. Disclosed are arrangements, referred to as Multi-channel Modulated Mark Encoding arrangements, (or simply MCMME arrangements).

In one example, MCMME arrangements use "MCMME barcodes" (also referred to merely as "barcodes") to support transport of useful amounts of data content without consuming large areas of the page. This leaves more of the page free for human readable content, The MCMME arrangements are also quite robust against the treatment that printed pages commonly undergo, including folding, wrinkling, staining and tearing. Furthermore the MCMME arrangements support multiple data message streams, which can have different levels of robustness.

According to a first aspect of the present invention, there is provided a method of encoding information in a document using a plurality of marks, said information comprising first data and second data, the method comprising the steps of:
    encoding the first data using a first plurality of arrays of modulated marks disposed in a corresponding first plurality of tiles spaced apart from each other at a first repeat rate; and
    encoding the second data using a second plurality of arrays of modulated marks disposed in a corresponding second plurality of tiles spaced apart from each other at a second repeat rate; wherein:
    the second repeat rate is different to the first repeat rate; and
    the second plurality of tiles are embedded within the first plurality of tiles.

According to another aspect of the present invention, there is provided a method of decoding information encoded in a document using a plurality of marks, said information comprising first data and second data, the first data having been encoded using a first plurality of arrays of modulated marks disposed in a corresponding first plurality of tiles spaced apart from each other at a first repeat rate, the second data having been encoded using a second plurality of arrays of modulated marks disposed in a corresponding second plurality of tiles spaced apart from each other at a second repeat rate; wherein the second repeat rate is different to the first repeat rate, and the second plurality of tiles are embedded within the first plurality of tiles, the method comprising the steps of:
    determining, using the first repeat rate the position and orientation of a grid whose grid intersection points represent the nominal positions of the plurality of marks encoding the first data;
    determining, using the second repeat rate the position and orientation of a grid whose grid intersection points represent the nominal positions of the plurality of marks encoding the second data; and
    demodulating the plurality of marks encoding the first data and the plurality of marks encoding the second data to thereby recover the information.

According to another aspect of the present invention, there is provided an apparatus for encoding information in a document using a plurality of marks, said information comprising first data and second data, said apparatus comprising:
    a memory for storing a program; and
    a processor for executing the program, said program comprising:
    code for encoding the first data using a first plurality of arrays of modulated marks disposed in a corresponding first plurality of tiles spaced apart from each other at a first repeat rate; and
    code for encoding the second data using a second plurality of arrays of modulated marks disposed in a corresponding second plurality of tiles spaced apart from each other at a second repeat rate; wherein:
    the second repeat rate is different to the first repeat rate; and
    the second plurality of tiles are embedded within the first plurality of tiles.

According to another aspect of the present invention, there is provided an apparatus for decoding information encoded in a document using a plurality of marks, said information comprising first data and second data, the first data having been encoded using a first plurality of arrays of modulated marks disposed in a corresponding first plurality of tiles spaced apart from each other at a first repeat rate, the second data having been encoded using a second plurality of arrays of modulated marks disposed in a corresponding second plurality of tiles spaced apart from each other at a second repeat rate; wherein the second repeat rate is different to the first repeat rate, and the second plurality of tiles are embedded within the first plurality of tiles, said apparatus comprising:
    a memory for storing a program; and
    a processor for executing the program, said program comprising:
    code for determining, using the first repeat rate the position and orientation of a grid whose grid intersection points represent the nominal positions of the plurality of marks encoding the first data;
    code for determining, using the second repeat rate the position and orientation of a grid whose grid intersection points represent the nominal positions of the plurality of marks encoding the second data; and
    code for demodulating the plurality of marks encoding the first data and the plurality of marks encoding the second data to thereby recover the information.

According to another aspect of the present invention, there is provided a computer program product including a computer readable medium having recorded thereon a computer program for implementing any one of the methods described above.

Other aspects of the invention are also disclosed.

BRIEF DESCRIPTION OF THE DRAWINGS

One or more embodiments of the present invention will now be described with reference to the drawings in which.

FIG. 12 is intentionally blank;

FIG. 14 is intentionally blank;

FIG. 15 is intentionally blank;

DETAILED DESCRIPTION INCLUDING BEST MODE

Figure 1:
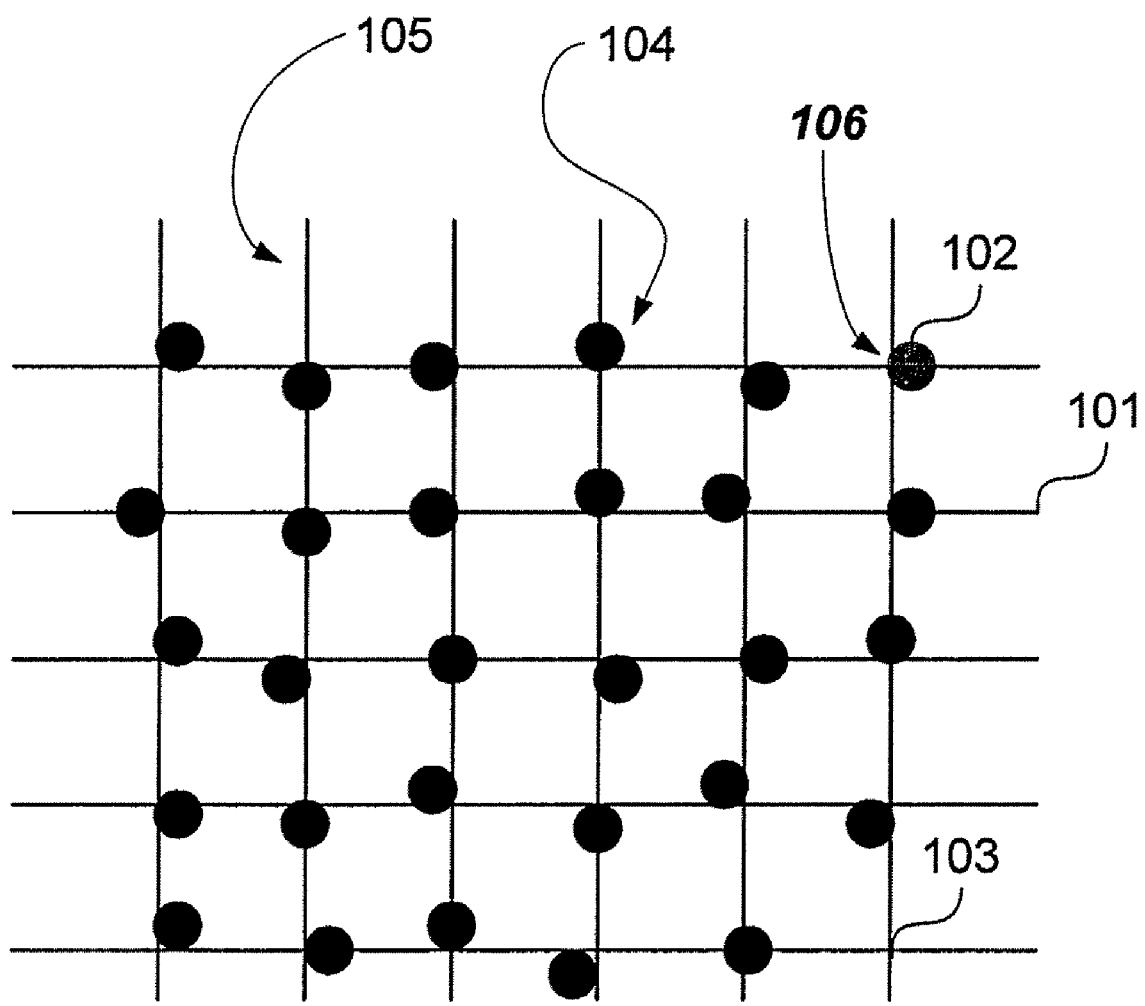
FIG. 1 illustrates an array of dots that have been phase modulated so that they no longer entirely lie on a regular grid.

Where reference is made in any one or more of the accompanying drawings to steps and/or features, which have the same reference numerals, those steps and/or features have for the purposes of this description the same function(s) or operation(s), unless the contrary intention appears.

The disclosed MCMME arrangements relate to encoding two data channels into a single dot pattern, where the dot pattern is a modulated grid of dots. In a first arrangement, the dot pattern does not have any alignment or synchronizing marks.

1. Basic Structure

FIG. 1 shows a view of a modulated array 104 of protection marks relative to a reference grid 105. The modulated array 104 of protection marks consists of a large number of marks (being dots such as 102 in the disclosed example) whose centroids lie close to corresponding intersection points (also referred to merely as grid intersections) 106 of the (square) grid 105. It is only the array 104 of dots 102 that that is incorporated onto the page in question, and the grid 105 is shown merely for illustration of the location of the dots 102. The grid can thus be considered to be a "virtual grid". The appearance of the modulated array 104 is similar to that of an unmodulated array of dots, but is not identical thereto.

Figure 2:
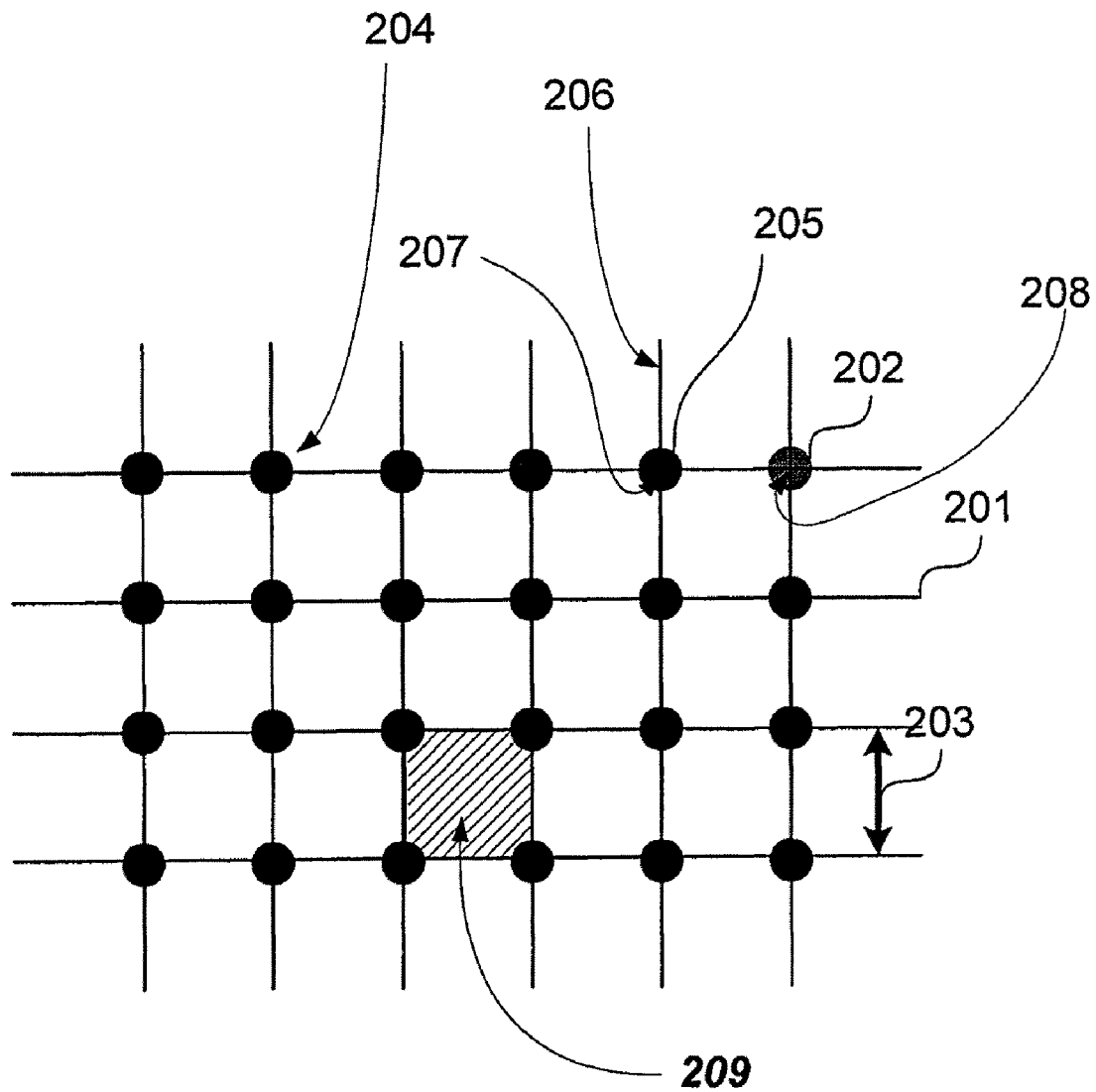
FIG. 2 illustrates a regular array of dots lying on a regular grid.

FIG. 2 shows the appearance of an unmodulated array 204 of dots. Respective centroids of dots 202, 205 (for example) in the unmodulated array 204 form a regular grid, and these centroids lie on respective intersection points 208, 207 of a (virtual) grid 206. These grid intersection points represent the nominal (unmodulated) positions of the dots. The pitch of the square grid 206, herein referred to as "grid spacing" is depicted by an arrow 203. The grid 206 describes grid squares such as 209.

The difference between the unmodulated array 204 of dots in FIG. 2 and the modulated array 104 of dots in FIG. 1 is that the positions of the dots in the modulated array 104 are modulated (ie spatially modulated, or spatially displaced in the example shown) from the locations of the respective grid intersection points that the dots would occupy if the dots formed in unmodulated array, as depicted in FIG. 2. This modulation serves a number of purposes. One purpose is to make the modulated array 104 of dots 102 slightly less visible to a person than the dots of a regular array 204. This is because the human visual system is very adept at noticing regular arrays. Another purpose of the modulation is to enable a message, in the form of digital data, to be stored in the modulation of the dots.

Figure 3:
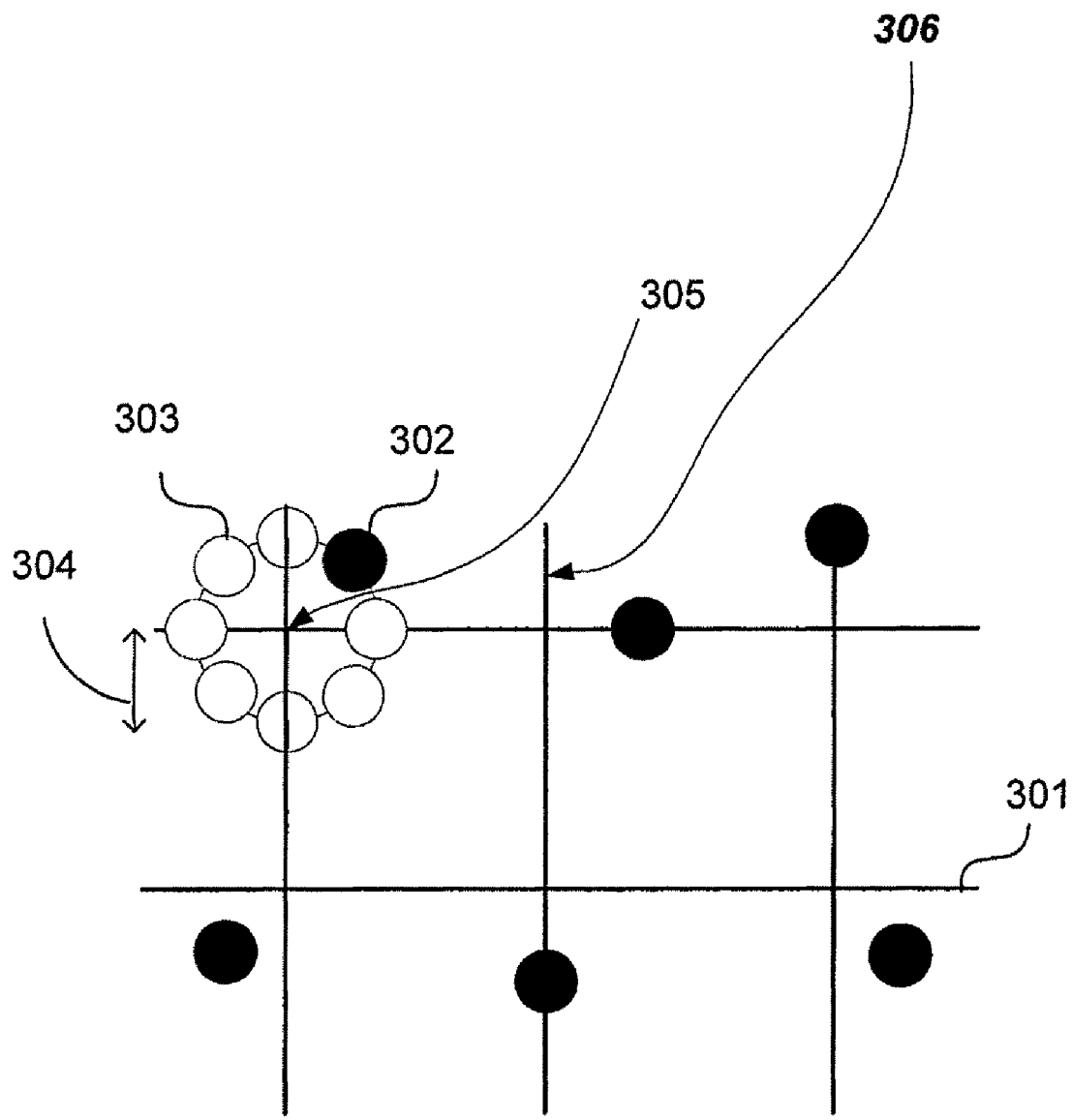
FIG. 3 shows the modulation of the dots in greater detail.

FIG. 3 shows modulation of the dots in FIG. 1 in greater detail. Dots such as 302 lie close to the corresponding intersection point 305 of a regular grid 306, and each dot is modulated to one of eight possible positions such as 303. The eight possible modulation positions for each dot are, in the present example, arranged in a circle centred on the relevant grid intersection point 305. The eight modulation positions are offset from the grid intersection point 305 horizontally, vertically or diagonally. The horizontal and vertical distance by which the dots are offset is referred to as the modulation quantum 304, herein abbreviated as "mq".

Figure 4:
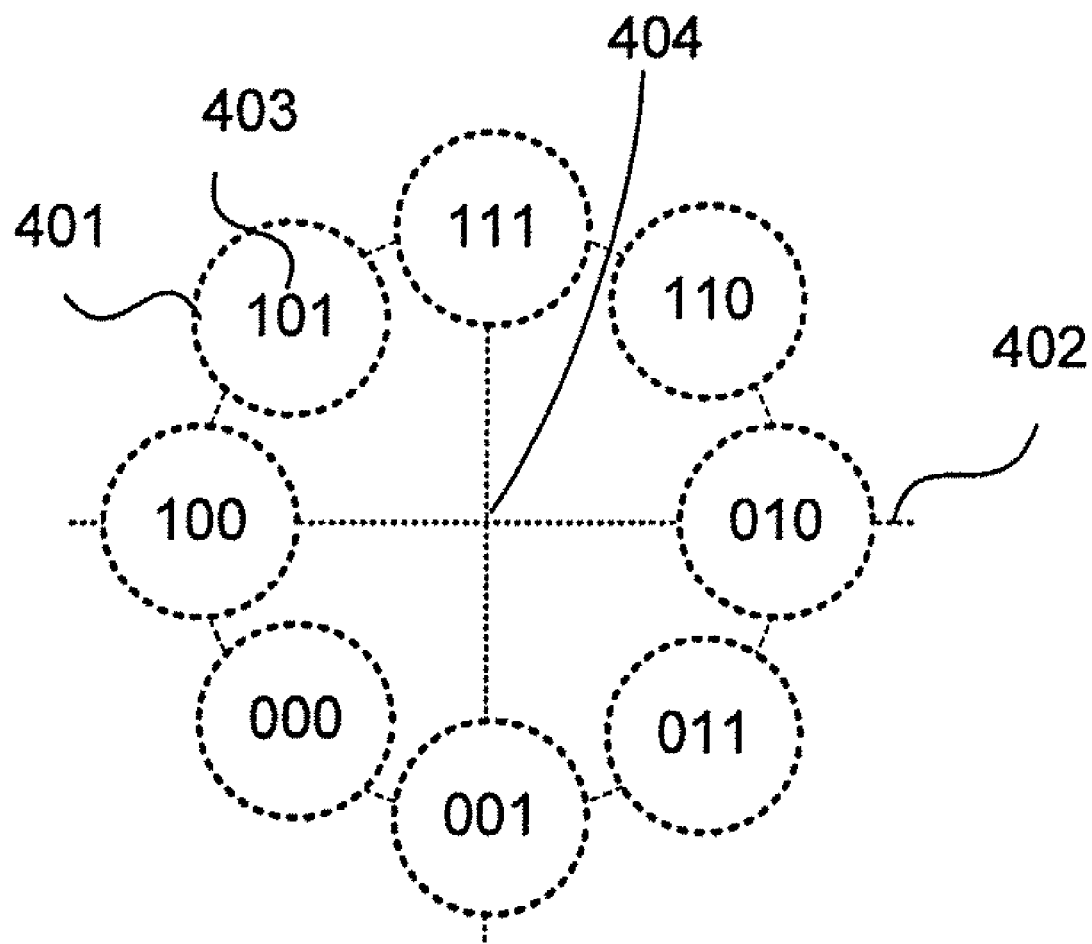
FIG. 4 shows the modulation of the dots in even greater detail.

FIG. 4 shows dot modulation positions in greater detail. The dot modulation positions are centred on a grid intersection point 404 of the grid 402, and each modulation position such as 401 has a digital code value 403 associated with it. The eight modulation positions (including 401) thus allow each dot to encode one of eight possible digital code values (including 403 for 401). This arrangement allows a modulated array of marks to act as a digital data store, with each dot of the modulated array storing one base-eight digit of data in the illustrated example. In one arrangement, each dot encodes a code value such that the dots are arranged in a gray code in the circle. This facilitates error correction during decoding during which the information encoded into the dots is recovered by demodulation and data recovery. FIG. 4 shows, in binary format, the digital code values associated with each modulation position associated with the grid intersection point 404. Thus, starting clockwise from 403, the dots encode the decimal values 5, 7, 6, 2, 3, 1, 0 and 4.

Figure 5:
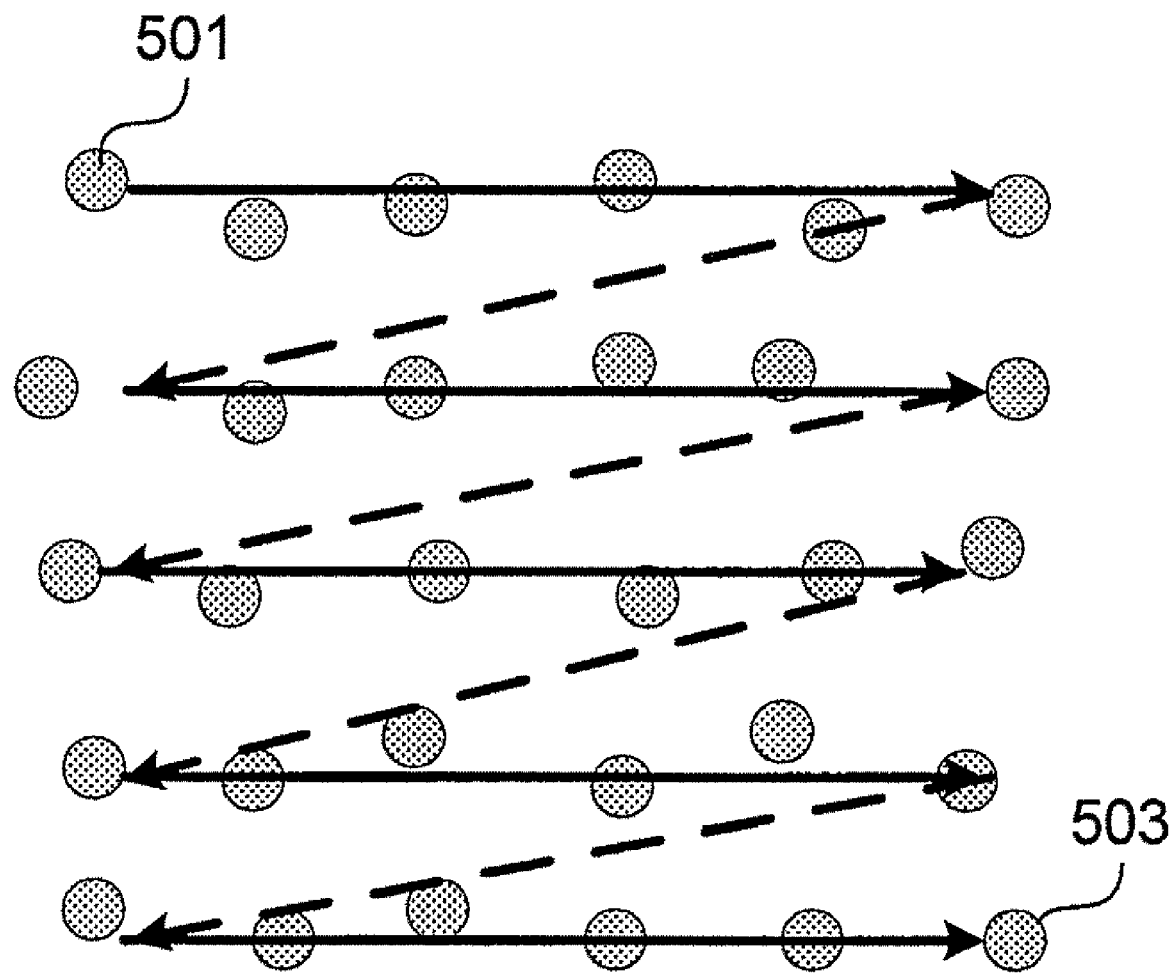
FIG. 5 shows the ordering for the digits of a modulated grid.

FIG. 5 shows one arrangement for ordering the digits of the digital data store using the disclosed MCMME arrangements. In the described example, the ordering is provided by using a rectangular array of dots as shown. This ordering starts at a topmost, leftmost dot 501 and proceeds left to right and then from top to bottom until the bottommost, rightmost dot 503 is reached. It is of course possible to use other orderings. It is also possible to use other configurations of the grid (other than regular square as illustrated in FIGS. 1 and 2). It is also possible to use other spatial modulation position arrangements (other than circular as shown in FIGS. 3 and 4).

Encoder

Figure 6:
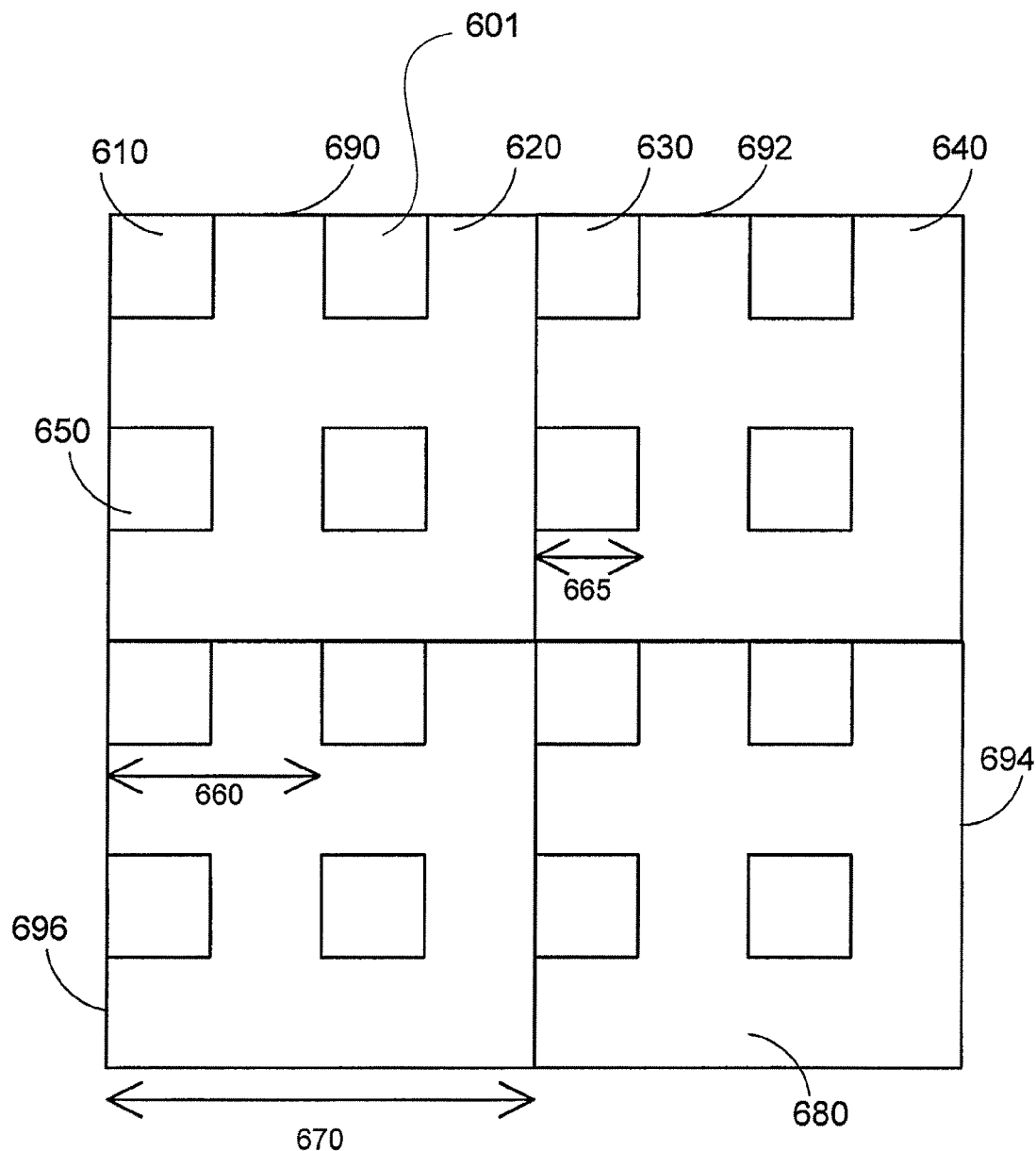
FIG. 6 illustrates an example of an MCMME barcode.

FIG. 6 shows an encoded MCMME barcode (also referred to simply as a barcode) arranged in a repeated, tiled manner. The barcode shown in FIG. 6 is also referred to as a barcode pattern. The MCMME barcode is composed of square tiles 690, 692, 694 and 696 referred to as "MCMME tiles" or merely as "tiles". Each tile in the MCMME barcode carries data for two data channels, namely a high data density (herein referred to as "HDD") channel and a low data density (herein referred to as "LDD") channel. The aforementioned data is incorporated into the tiles by disposing appropriately modulated marks into the tiles. Other numbers of channels may also be supported using the MCMME approach. In the described example, the density of the dots on the page, ie the dots per square cm, for the LDD and HDD channels are the same. The amount of information for the LDD and HDD channels is however different due to the relative size of the tiles used.

In the described example, the HDD channel has low robustness, while the LDD channel has high robustness.

Each tile such as 690 in the barcode contains several copies of a small LDD square tile 610, referred to merely as an "LDD tile". For example, 610, 630 and 650 are identical copies of an LDD tile. Each (square) LDD tile has a size of 665 (herein referred to as 'LDD tile size'). Additionally, each tile in the barcode contains a single copy of a large HDD tile, which comprises the remaining area in the tile (ie the area of the MCMME tile less the area of the LDD tiles within the MCMME tile). For example, 620, 640 and 680 are identical copies of an HDD tile. Thus, HDD tiles are "overlaid" on top of LDD tiles, or alternately, the LDD tiles overlap the HDD tiles, or alternately, the LDD tiles are embedded in the HDD tiles.

In summary, each MCMME tile (such as 690) includes a number of LDD tiles (such as 610). The residual area of the MCMME tile 690, less the sum of the areas of the included LDD tiles in the tile, constitutes the HDD tile associated with the MCMME tile in question. From a data carrier perspective, all LDD tiles in the barcode example shown in FIG. 6 carry the same data, thereby providing redundancy against corruption of the LDD data channel. Furthermore, all HDD tiles in the barcode example shown in FIG. 6 carry the same data, thereby providing redundancy against corruption of the HDD data channel.

Although tiles of a specific shape have been described in this example, other shapes can be utilised for the MCMME tiles, the LDD tiles, and the HDD tiles.

In the first arrangement, the barcode encodes the LDD channel and the HDD channel in the form of respective arrays of dots which appear, to a person, as dot patterns. The distance between consecutive LDD tiles, ie the distance by which the tiles are spaced apart, measured in integral multiples of grid squares, is 660 (herein referred to as "LDD step size"). The distance 660 is also referred to as the LDD repeat rate. The distance between consecutive HDD tiles, measured in multiples of LDD step size. If HDD tile size is not a LDD step size multiple more processing is needed as different intervals need to be searched), is 670 (herein referred to as "HDD tile size"). The distance 670 is also referred to as the HDD repeat rate, ie the distance by which the tiles are spaced apart. The barcode example shown in FIG. 6 has an HDD tile size of 2 LDD step size by 2 LDD step size, where HDD tiles are separated by a distance of HDD tile size, and within each tile, each LDD tile is separated by a distance of 'LDD step size'.

According to the present example of the disclosed MCMME arrangements, the barcode shown in FIG. 6 includes a number of MCMME tiles, each of which includes an HDD tile and a number of LDD tiles.

Figure 7:
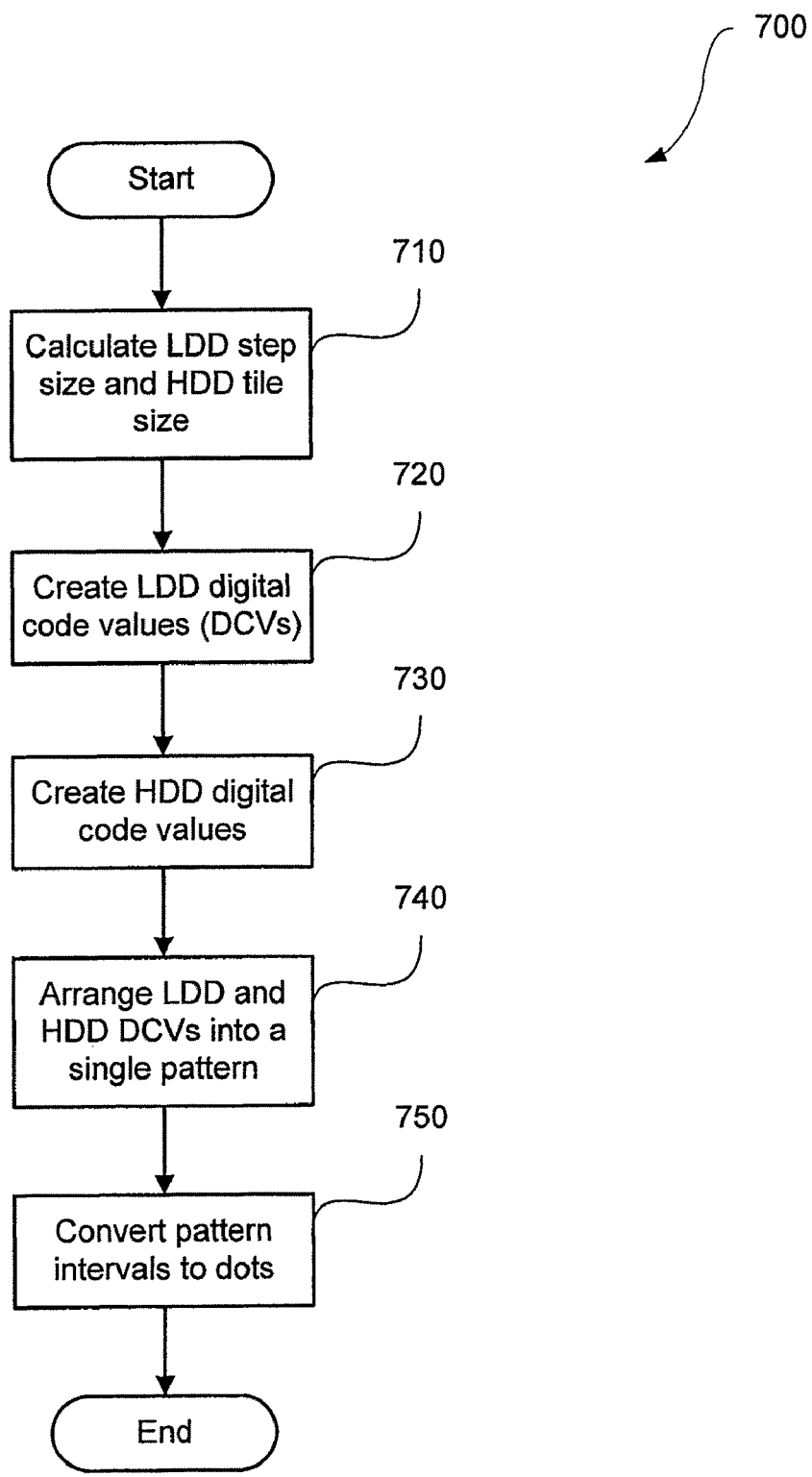
FIG. 7 is a flowchart showing the steps to encode a barcode pattern with two data channels.

FIG. 7 shows a method 700 for encoding LDD data and HDD data associated with respective LDD and HDD messages into a single MCMME barcode. The method commences at a step 710, where the LDD step size and HDD tile size are calculated. The LDD tile size is fixed. The first arrangement has a LDD tile size of 10. The step 710 determines the optimal LDD step size and HDD tile size based on the size of the LDD and HDD messages to be encoded. Ideally, the LDD step size and HDD tile size are calculated to maximise redundancy of the LDD tiles and minimise the unused data in the HDD tile. There is a minimum and maximum bound for the LDD step size measured in grid squares, and a minimum and maximum bound for the HDD tile size measure in LDD step size. The bounds are used to narrow the search space when calculating the LDD step size and HDD tile size for decoding a MCMME barcode. In the first arrangement, the bounds are:

$16 \leq LDD$ step size $\leq 30$ $2 \leq HDD$ tile size $\leq 7$

Error Correction Codes (ECCs) such as Reed-Solomon or Low Density Parity Check (LDPC) can be used during encoding of the LDD and HDD messages. ECCs are used in digital communication systems to overcome channel errors introduced between the encoding and decoding stages. Utilisation of a strong ECC can make a barcode highly robust to errors which may be introduced by folding, wrinkling, staining, tearing and defacement of the document carrying the barcode. In the first arrangement, LDPC is used during encoding, due to its iterative error correction properties.

Using ECC during encoding is optional to the MCMME encoding process. To use ECC during encoding, ECC encoding is applied to the original LDD message to obtain a final (coded) LDD message.

Next, a step 720 converts the LDD message into 3 bit digital code values (also referred to as "intervals"). This involves dividing the final (coded) LDD message into groups of 3 bits and converting each 3 bit group into its corresponding digital code value.

A following step 730 converts the HDD message into digital code values in the same manner. If ECC is used for encoding, the HDD message is encoded using ECC to obtain the final (coded) HDD message. The final HDD message is then converted into 3 bit groups and each 3 bit group is converted to its corresponding digital code value.

A following step 740 arranges the respective LDD and HDD digital code values from the steps 720 and 730 into a single barcode. The single barcode has a general form similar to that shown in FIG. 6, using the LDD step size and HDD tile size calculated in the step 710.

Finally, a subsequent step 750 converts all digital code values in the barcode to respective modulated dots in an array associated with a grid with the same grid spacing and mq. In the first arrangement, the barcode tiles are repeated across a page to form a low visibility barcode. The barcode need not however cover the entire area of the page and may have text or other information covering some sections of the barcode.

Decoder

Figure 8:
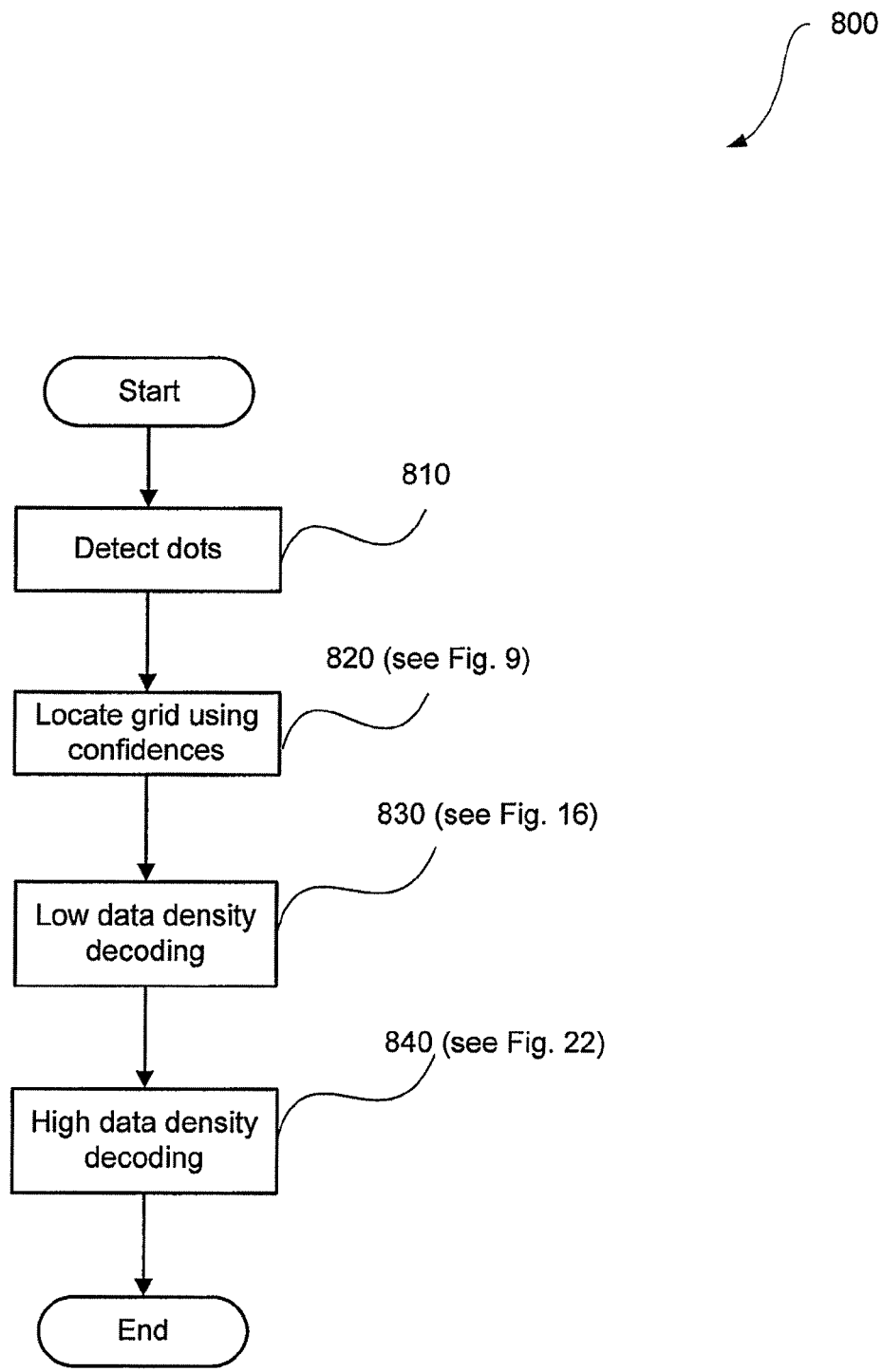
FIG. 8 is a flowchart showing the steps to decode a barcode pattern containing a high and low data density message.

FIG. 8 shows an example of a method 800 for decoding an MCMME barcode that has been encoded into an input image. A step 810 takes the input image and detects the dots that have been encoded onto the image using the MCMME encoding approach. In a following step 810, the positions of the detected dots which comprise the barcode are recorded in a list of coordinate data. Accordingly, the step 810 extracts information about the dots which comprise the barcode. The step 810 may be performed using connected component analysis of the scanned image. In such analysis, individual pixels of the image are examined to connect and group those pixels that are spatially adjacent. By analysing a group of pixels in terms of its shape, the presence of a mark (ie. a circular dot or generally uniform blob of pixels of the appropriate expected size) can be detected. The centroid of the mark may then be determined in order to identify a coordinate location corresponding to the detected mark (dot).

Next, referring back to FIG. 8, a following step 820 locates the grid intersections for the array of dots detected in the step 810 within the image. Once the underlying grid has been located, a following step 830 decodes the LDD message and a step 840 decodes the HDD message that are encoded in the barcode.

2. Navigation

Figure 9:
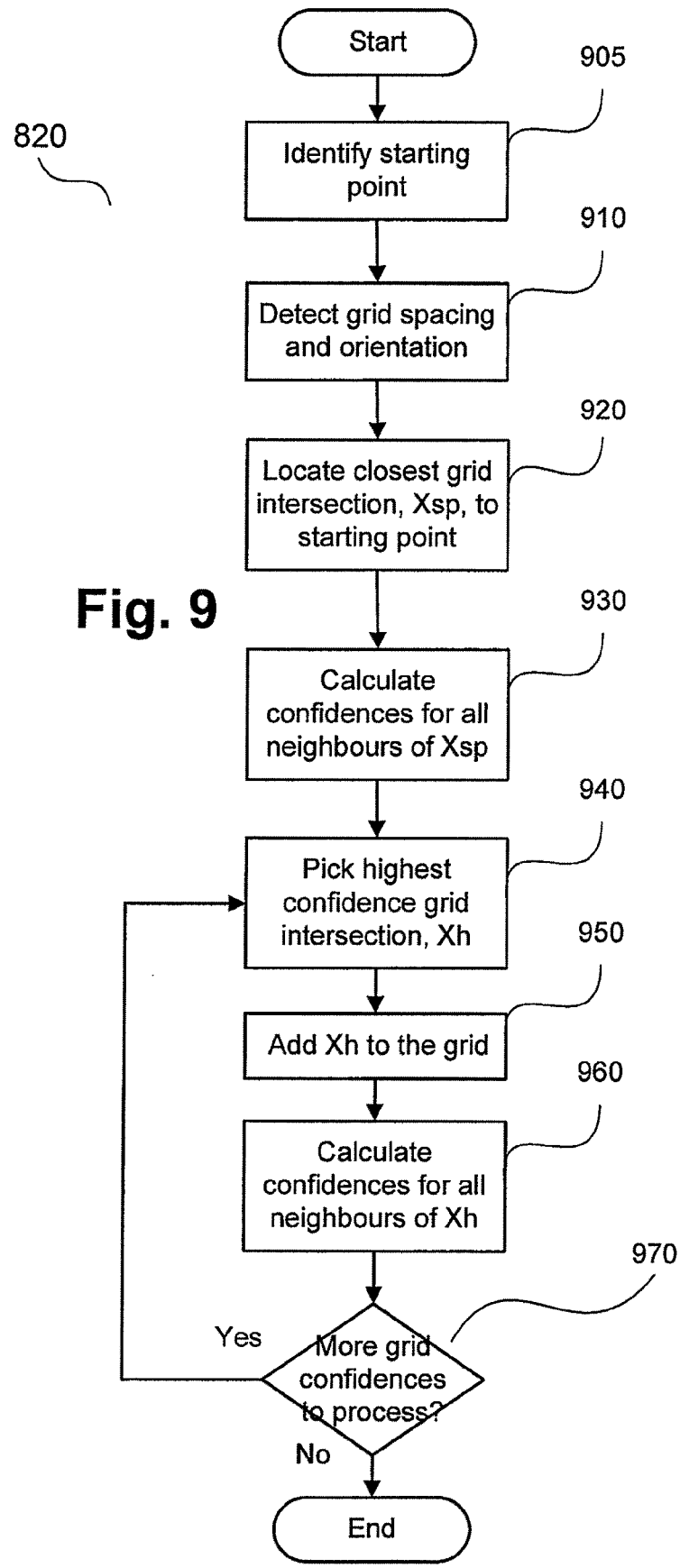
FIG. 9 is a flowchart showing the steps to identify the grid of the barcode pattern.

FIG. 9 depicts the step 820 (see FIG. 8) in greater detail. FIG. 9 shows a method (herein referred to as 'grid navigation') of locating the underlying grid in a barcode using a confidence measure. Processing commences at a step 905, which identifies a starting point at which to begin growing out the grid. The starting point can be anywhere in the barcode on the input image. However, in the first arrangement, the starting point is chosen to be at the centre of the barcode. Next, a step 910 determines the grid spacing and orientation of the grid.

Figure 25:
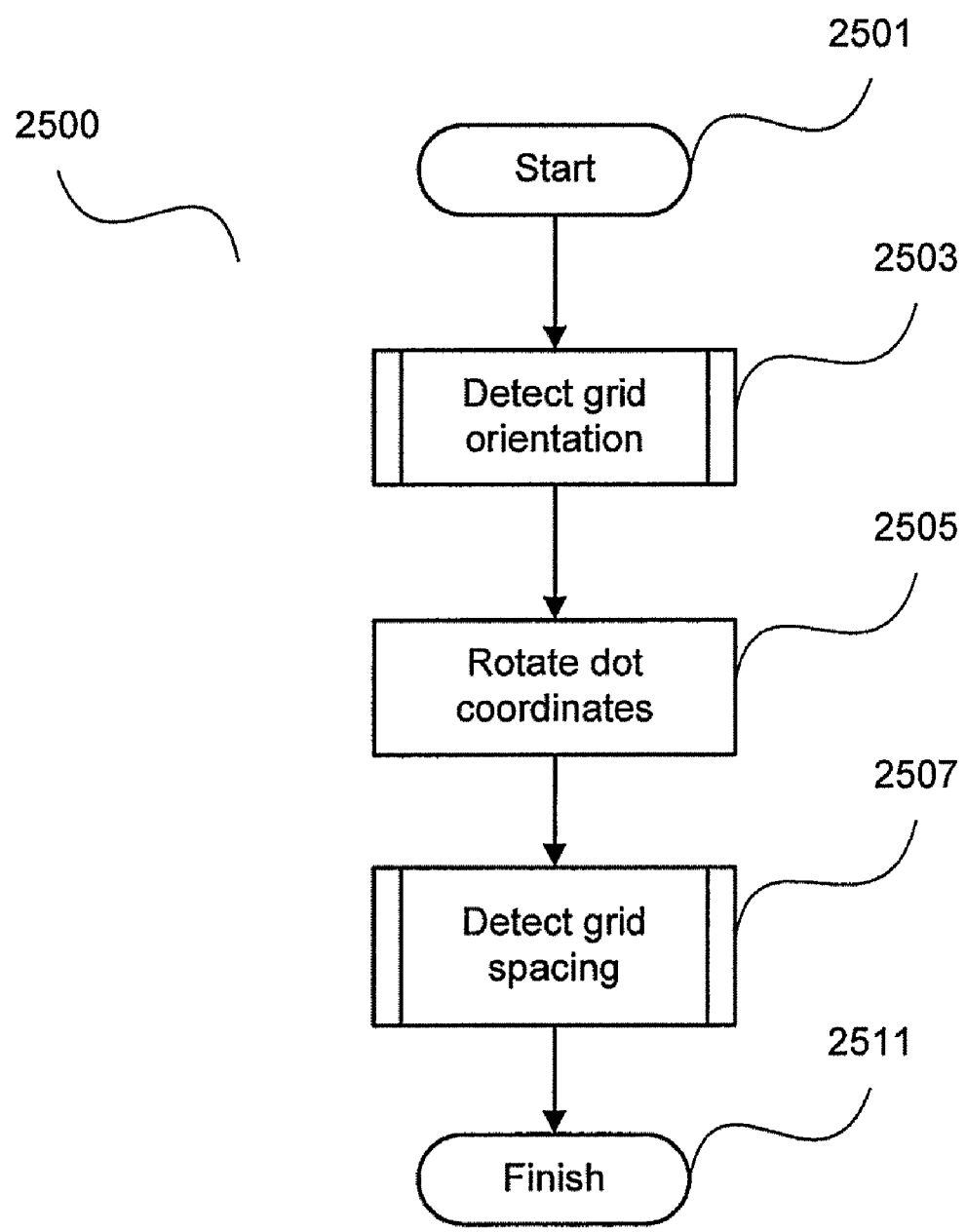
FIG. 25 shows a process for detecting the grid orientation, scale and translation in a grid of dots.

At step 910, the grid spacing and orientation of the grid is determined as follows. From the starting point, a process 2500 then detects the grid spacing and orientation corresponding to the starting point, using the dots in the image. Process 2500 is now described in greater detail with respect to FIG. 25. The process begins at an initial step 2501. In a following step 2503 the grid orientation is calculated from the coordinates of the dots in the image. This step will be described later in greater detail. Once the grid orientation has been calculated, a following step 2505 applies a rotation to all the dot coordinates in the image. The rotation rotates by the grid orientation angle, so that the rotated dot coordinates have grid axes aligned with the x- and y-axes. Given the rotated dot coordinates, a following step 2507 calculates the grid spacing. A following step 2511 terminates process 2500.

Figure 26:
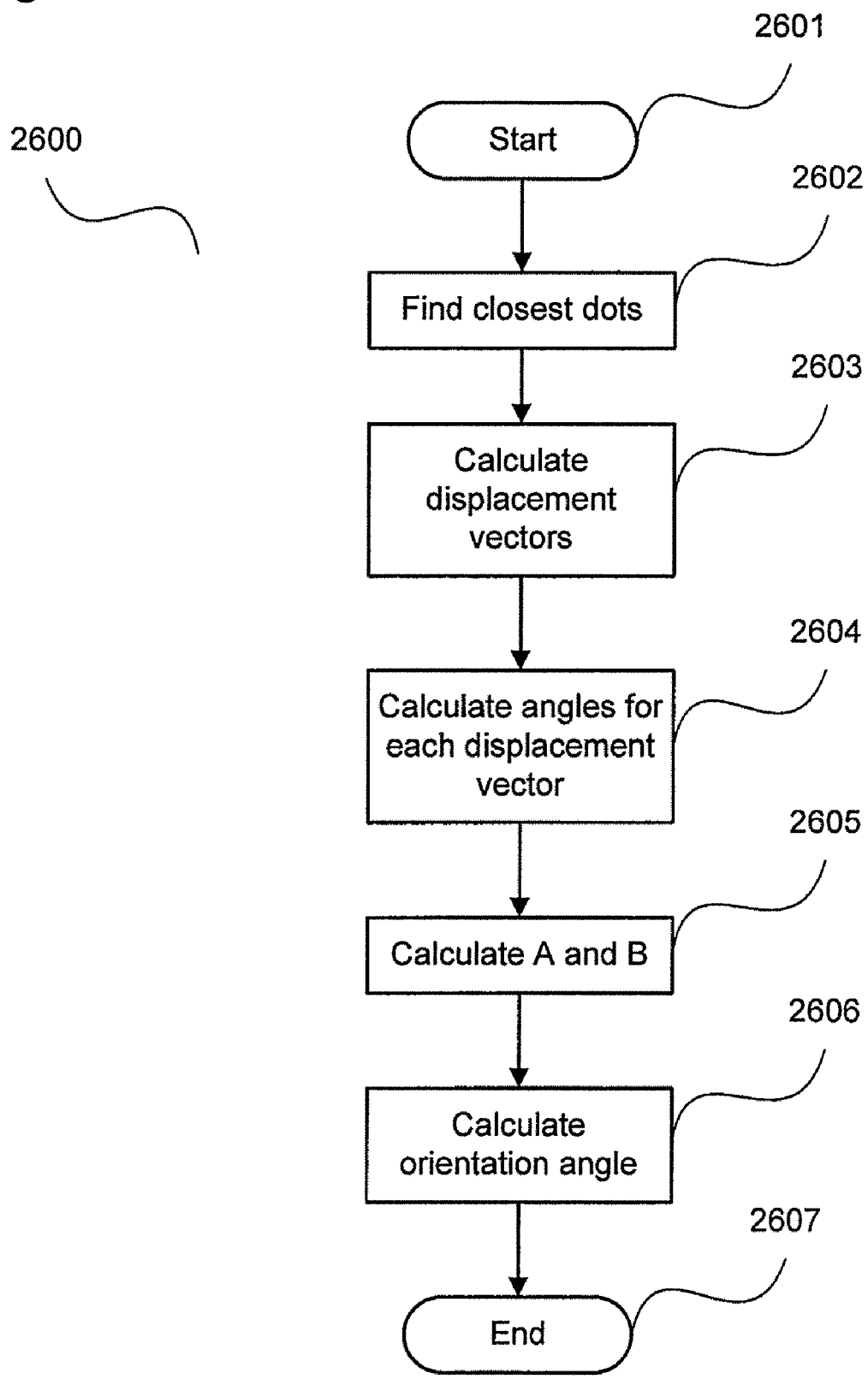
FIG. 26 shows a process for calculating the grid orientation.

Step 2503 is now discussed in greater detail. With reference to FIG. 26, step 2503 consists of a process 2600 that detects the grid orientation of the dots. The process begins at a step 2601.

A following step 2602 calculates, for each dot, what other dot is closest to it. This is done for every dot in the image. Methods for finding the closest dot to a given dot will be obvious to those skilled in the art. One simple method is to consider each other dot in turn, calculate its distance to the given dot, and then take the dot where the calculated distance was least. In a preferred implementation, a faster method is used where the entire image is divided into many 'buckets'. Each dot is assigned to the bucket that covers its location. To find the closest dot to a given dot, we start at the bucket that covers the given dot, look at all the dots in each of the buckets surrounding it, and take the dot closest to the given dot. If no dots exist in any of the surrounding buckets, the search is continued to the next nearest set of buckets radially outwards, and so on. This method greatly reduces the number of candidate dots considered for the closest dot.

A following step 2603 calculates the displacement vectors from each dot to its closest other dot, which was found in step 2602. Thus every dot has a corresponding displacement vector calculated for it.

A following step 2604 calculates, for each displacement vector calculated in step 2603, the angle of that displacement vector. The angle θ of a vector is well known to those skilled in the art, and may be calculated thus $$\theta = a\tan 2(y,x)$$

where x and y are the horizontal and vertical components of a vector. A following step 2605 calculates the values of variables A and B, defined as following:

$$A = \sum_i \cos(4\theta_i)$$

$$B = \sum_i \sin(4\theta_i)$$

where the $\theta_i$ are the angles of the displacement vectors found in step 2604. The sums are taken over all displacement vectors.

A following step 2606 then calculates the grid orientation angle φ using the formula:

$$\phi = a\tan 2(B,A)/4$$

The grid orientation detected at step 2606 is therefore within the range of −45 degrees to 45 degrees. A following step 2607 finishes process 2600.

Figure 27:
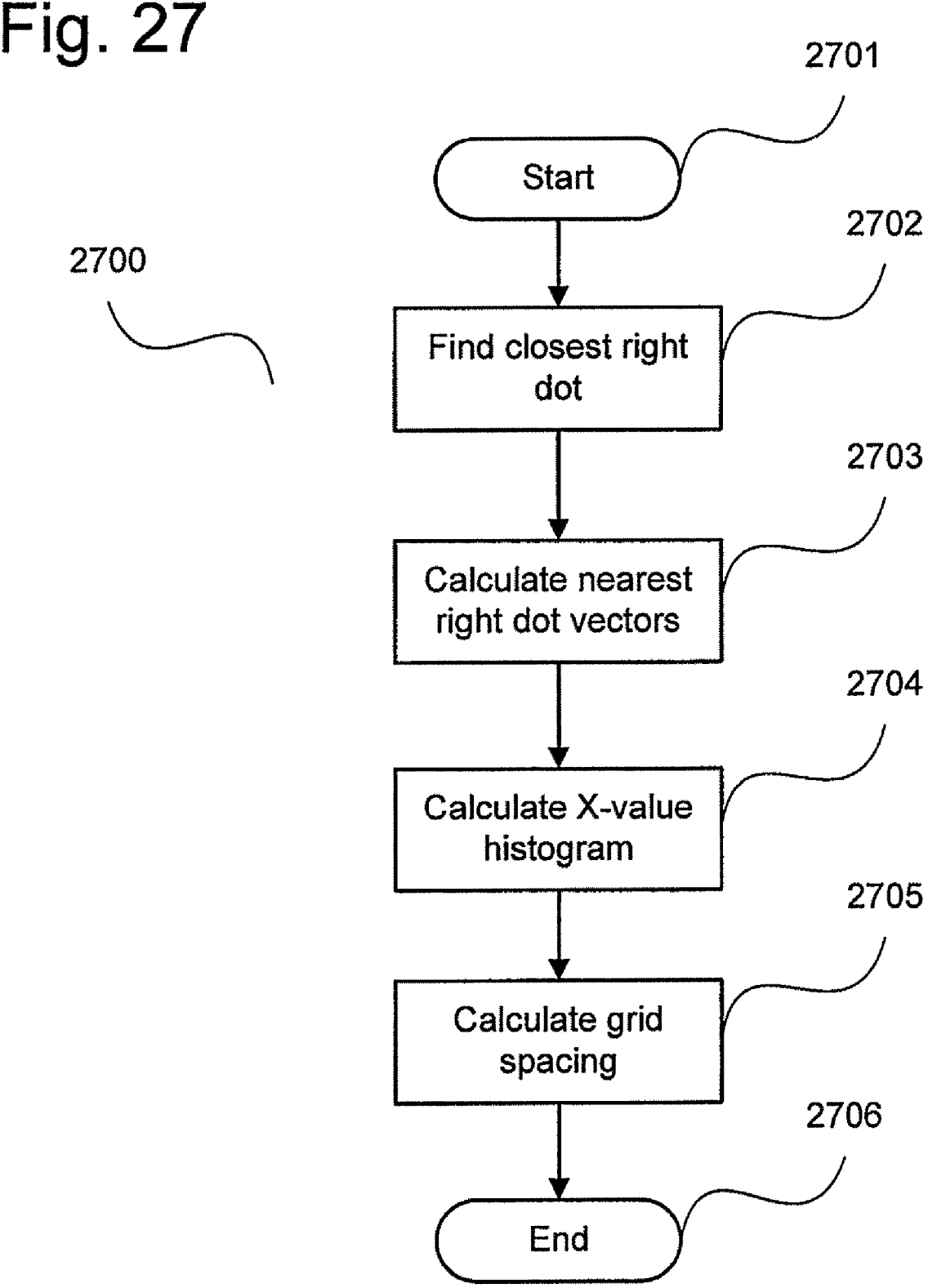
FIG. 27 shows a process for detecting the grid spacing.

Step 2507 is now considered in greater detail. Step 2507 executes a process 2700 as shown in FIG. 27. The process 2700 calculates the grid spacing. The process begins at step 2701.

A following step 2702 takes as input the list of rotated dots that have been detected in step 2505. For each dot (x, y), the nearest neighbouring dot to its right on the same horizontal row is found. To do this, the following heuristic is used. Every dot (a, b) that is not (x, y) is considered, and if (a, b) is outside the 90 degree sector to the right of (x, y), (a, b) is rejected. Formally, if $$a-x \leq 0 \text{ or } |a-x| \leq |b-y|$$

dot (a, b) is rejected. For the dots that are left, the dot that minimizes the function $$d(a,b) = |a-x| + 2|b-y|$$

is found. This dot is taken to be the dot to the right of (x, y) and stored in a list of right neighbour dots.

A following step 2703 takes each of the right neighbour dots (a, b) found and computes the difference vector (dx, dy) from (x, y); that is, $$(dx, dy) = (a,b) - (x,y)$$

Figure 28:
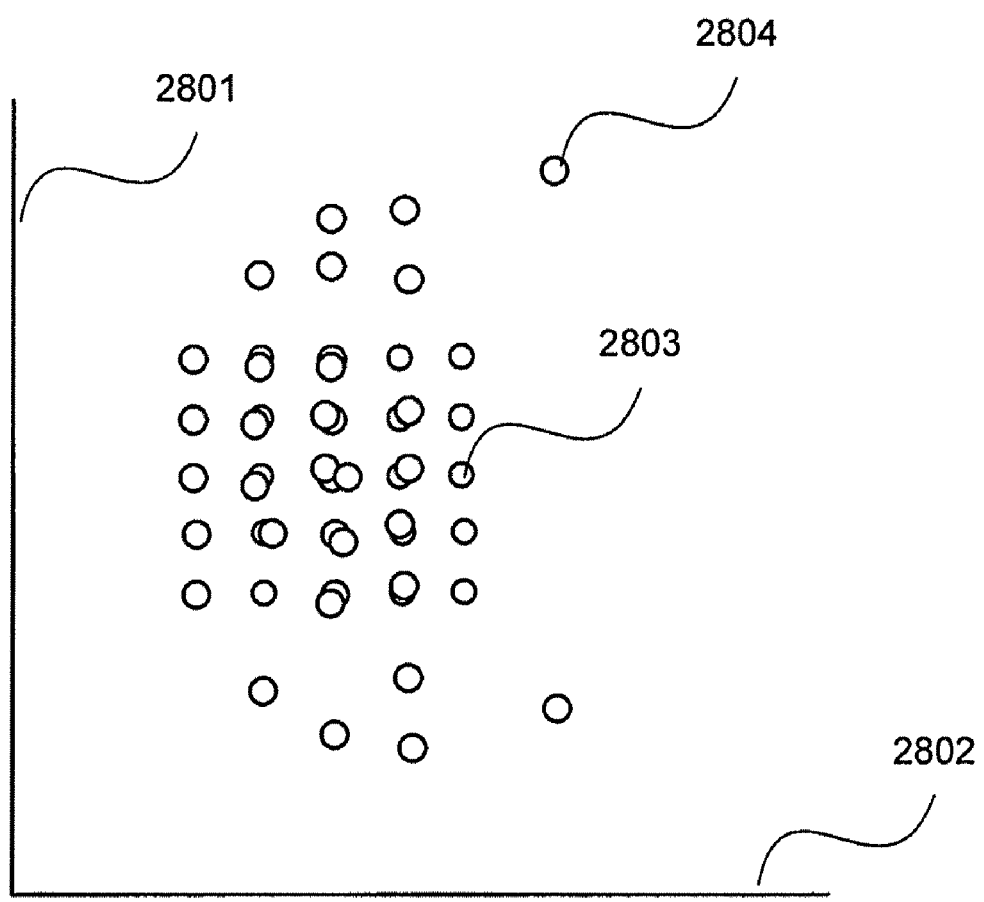
FIG. 28 shows a graph of a list of right neighbour difference vectors.

(dx, dy) is stored in a list of difference vectors. To help visualize the result, FIG. 28 shows a graph of a list of difference vectors. 2801 is the y-axis, 2802 is the x-axis, and a circle (for example 2803) is the terminal point of a difference vector. An important feature to notice is that due to noise and distortion in the grid, there will be some misplaced outlying points, such as 2804.

Figure 29:
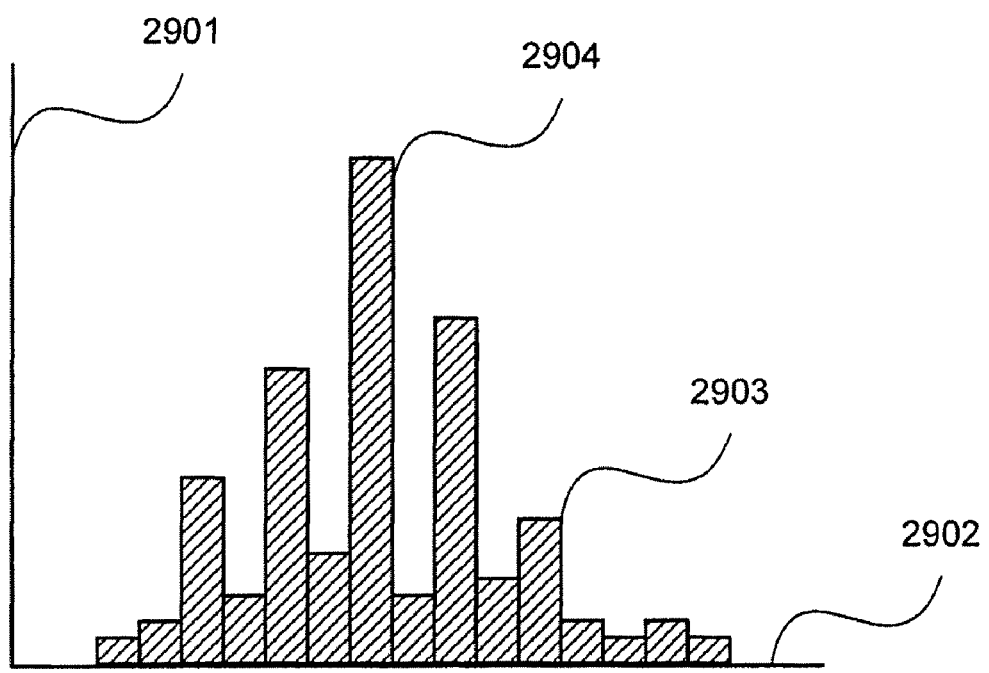
FIG. 29 shows a frequency histogram of x-values.

A following step 2704 takes the x-ordinate of each difference vector and creates a frequency histogram of the x-values. FIG. 29 shows the histogram. 2901 is the frequency axis, 2902 is the x-ordinate axis, and 2903 is a frequency bar. The size of each quantum in the x-ordinate axis should be related to the granularity of the dot coordinates. In our system the quantum is chosen to be 0.5 of the grid co-ordinate axis system.

A following step 2705 uses this histogram to calculate the grid spacing. Note that most of the right neighbours dots will be clustered around the spacing of the grid; hence, the grid spacing is found by taking the x-value of the most frequent x-ordinate, shown as 2904.

A following step 2706 concludes the process 2700.

Figure 10:
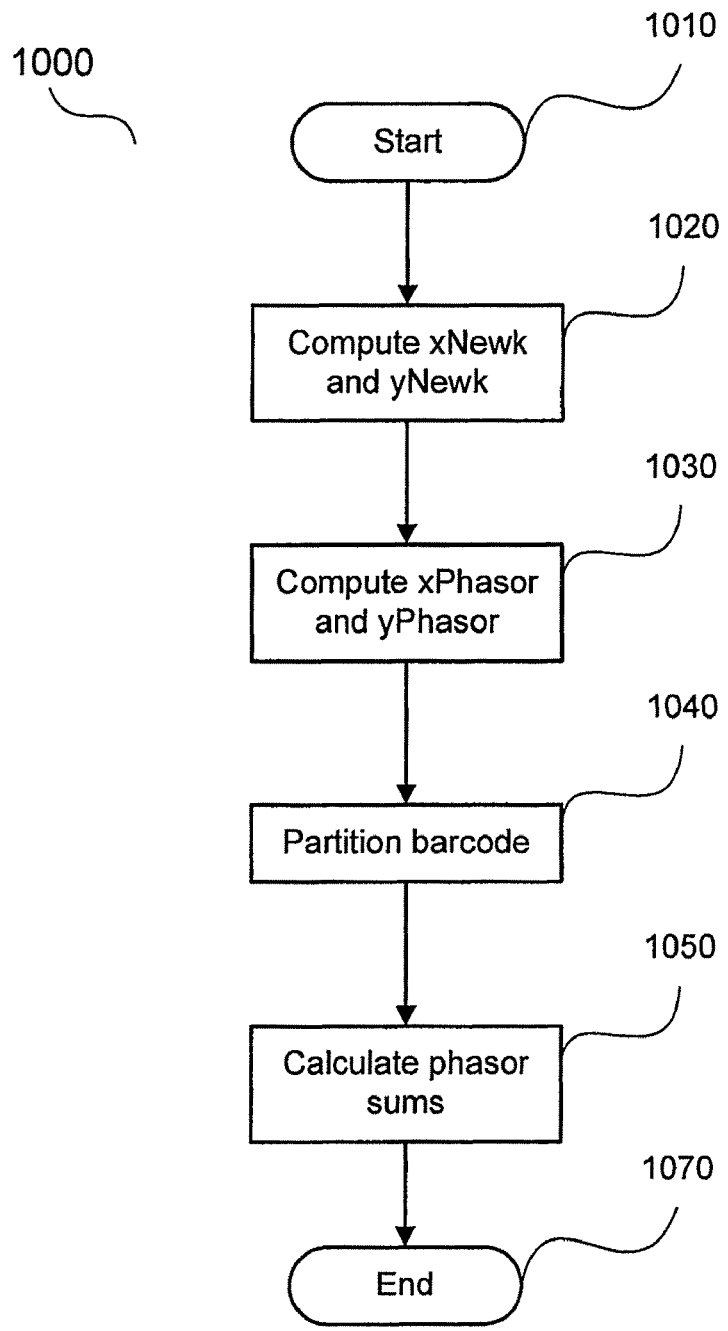
FIG. 10 is a flowchart showing the initialization steps for grid-fitting.

Referring to FIG. 9, following step 910, a step 920 identifies the grid intersection, $X_{sp}$, closest to the starting point, using grid-fitting. Grid-fitting is described in further detail in regard to FIG. 10.

A following step 930 calculates the confidences of all the neighbours of the starting grid intersection. That is, the approximate location of the four immediate neighbouring grid intersections of $X_{sp}$ are determined (using the grid spacing calculated in the step 910). Grid-fitting (see FIG. 10) is then used to calculate the estimated grid intersection of each neighbour and an associated confidence measure. Each estimated grid intersection and its associated confidence value are added to a confidence pool. The confidence measure is a measure of the algorithm confidence for the calculation of a grid intersection closest to a given pixel location. In the first arrangement, the confidence, conf, is measured by:

$$conf=\min(|xOffset|,|yOffset|)$$

where |xOffset| is the length of the xOffset phasor (as defined in the 'Grid-fitting' section); and

|yOffset| is the length of the yOffset phasor (as defined in the 'Grid-fitting' section).

Next, a step 940 selects the grid intersection, $X_h$, with the highest confidence measure. A following step 950 records $X_h$ in a list of processed grid intersection points, and removes $X_h$ from the confidence pool. Each grid intersection has an associated grid coordinate. Additionally, the closest dot to the grid-intersection is found and its displacement (herein referred to as an 'offset vector') from the grid-intersection is stored. It is possible that there is no dot close to the grid-intersection.

Next, a step 960 calculates the confidences for all neighbours of $X_h$. That is, similar to the step 930, the approximate location of the four immediate neighbours of $X_h$ is determined (using the grid spacing calculated in the step 910). Note that only the neighbours of $X_h$ that are not already in the list of processed grid intersection points are processed at the step 960. Grid-fitting (see FIG. 10) is then used to calculate the estimated grid intersection of each neighbour and its associated confidence value. Each estimated grid intersection and its associated confidence value are added to the confidence pool. At a following step 970, if there are more grid confidences in the confidence pool to process (where the grid confidence is above a minimum threshold), processing proceeds to the step 940. Otherwise, the method concludes.

3. Local Grid-Fitting

The method for local grid-fitting is now described in more detail. Grid-fitting as described herein is a process by which the grid-intersections are found. The grid-intersection is found by examining a local region, and finding the translation of the grid that best fits the dots in the local region. The closest grid-intersection to an input point is then determined.

In grid-fitting, an initialization step is performed before the first grid-intersection is needed. This initialization step precomputes some numbers. The step of estimating the grid-intersection uses the precomputed information.

The precomputed information depends on the grid spacing and orientation of the grid. Therefore, each grid navigator has its own store of precomputed information and has to perform its own initialization.

The initialization step 1000 is now described in more detail. The initialization process 1000, shown in FIG. 10, commences at step 1020. At step 1020, the process 1000 computes $xNew_k$ and $yNew_k$ for every dot $(x_k, y_k)$ in the barcode image. In order that the grid spacing becomes $2\pi$ and the grid orientation is accounted for, the following relation is satisfied:

$$\begin{pmatrix} xNew_k \\ yNew_k \end{pmatrix} = \frac{2\pi}{gridSpacing} \begin{pmatrix} \cos\theta & \sin\theta \\ -\sin\theta & \cos\theta \end{pmatrix} \begin{pmatrix} x_k \\ y_k \end{pmatrix}$$

where $\theta$ is the grid orientation detected in step 910.

In step 1330, the process 1000 computes the x- and y-phasors for every dot in the barcode image:

$$xPhasor=\cos(xNew_k)+j\sin(xNew_k)$$

$$yPhasor=\cos(yNew_k)+j\sin(yNew_k)$$

Here j is the square-root of minus-one.

Figure 11:
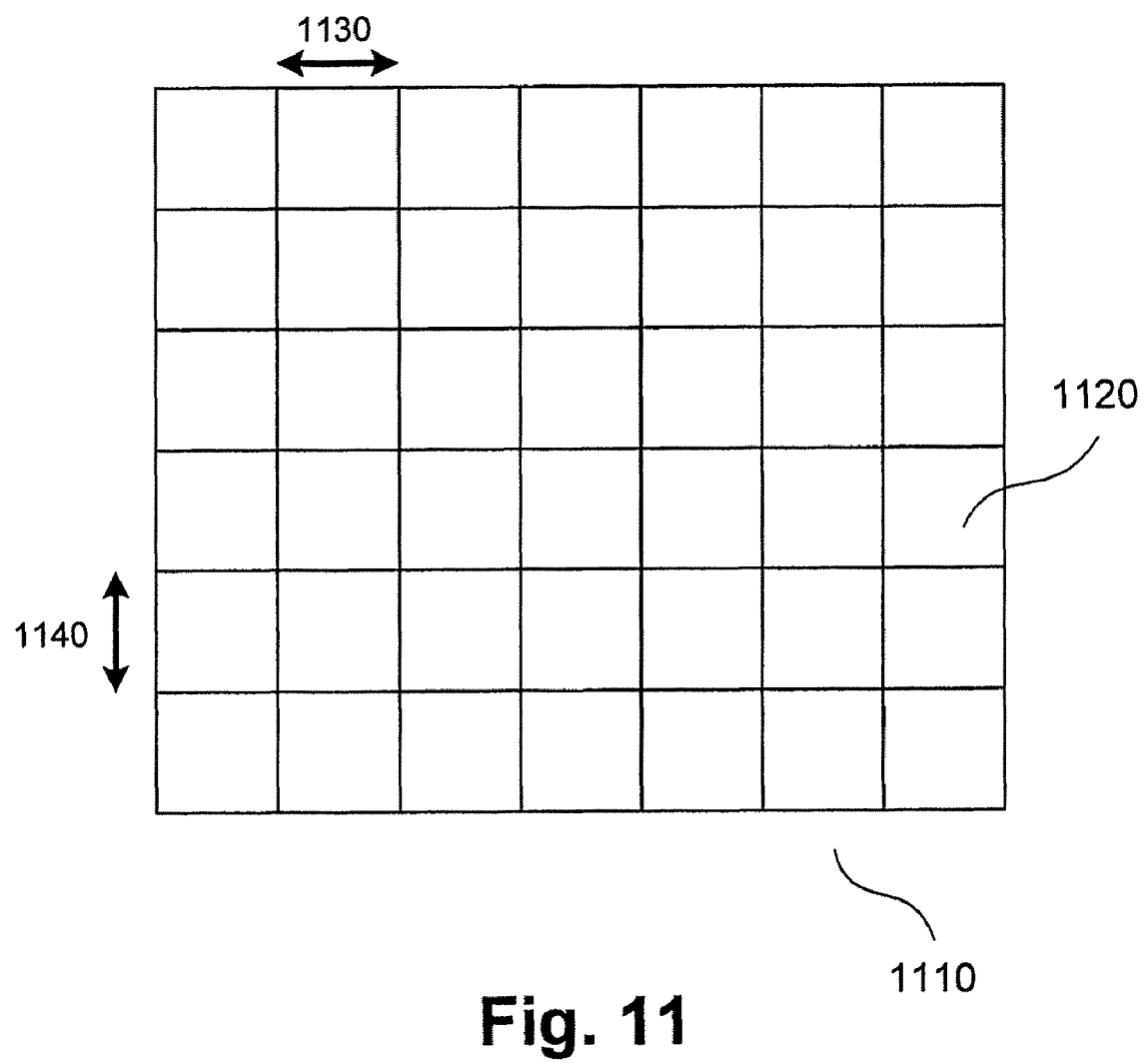
FIG. 11 illustrates a barcode image divided into phasor bins.

At step 1040, the barcode image is partitioned into phasor bins. In a preferred implementation, the phasor bins are 32×32 pixels in size, and tiled regularly across the image. For example, FIG. 11 shows a barcode image 1110, which is divided into phasor bins (e.g. 1120). The phasor bins have a vertical (y) size dimension 1440 and a horizontal (x) size dimension 1130. At step 1050, for each bin 1120, the process 1000 computes the sum of the x-phasors corresponding to the dots in the bin 1120. Similarly, for each bin 1120, the process computes the sum of the y-phasors. This concludes the initialization step 1000 of pre-computing information.

Figure 13:
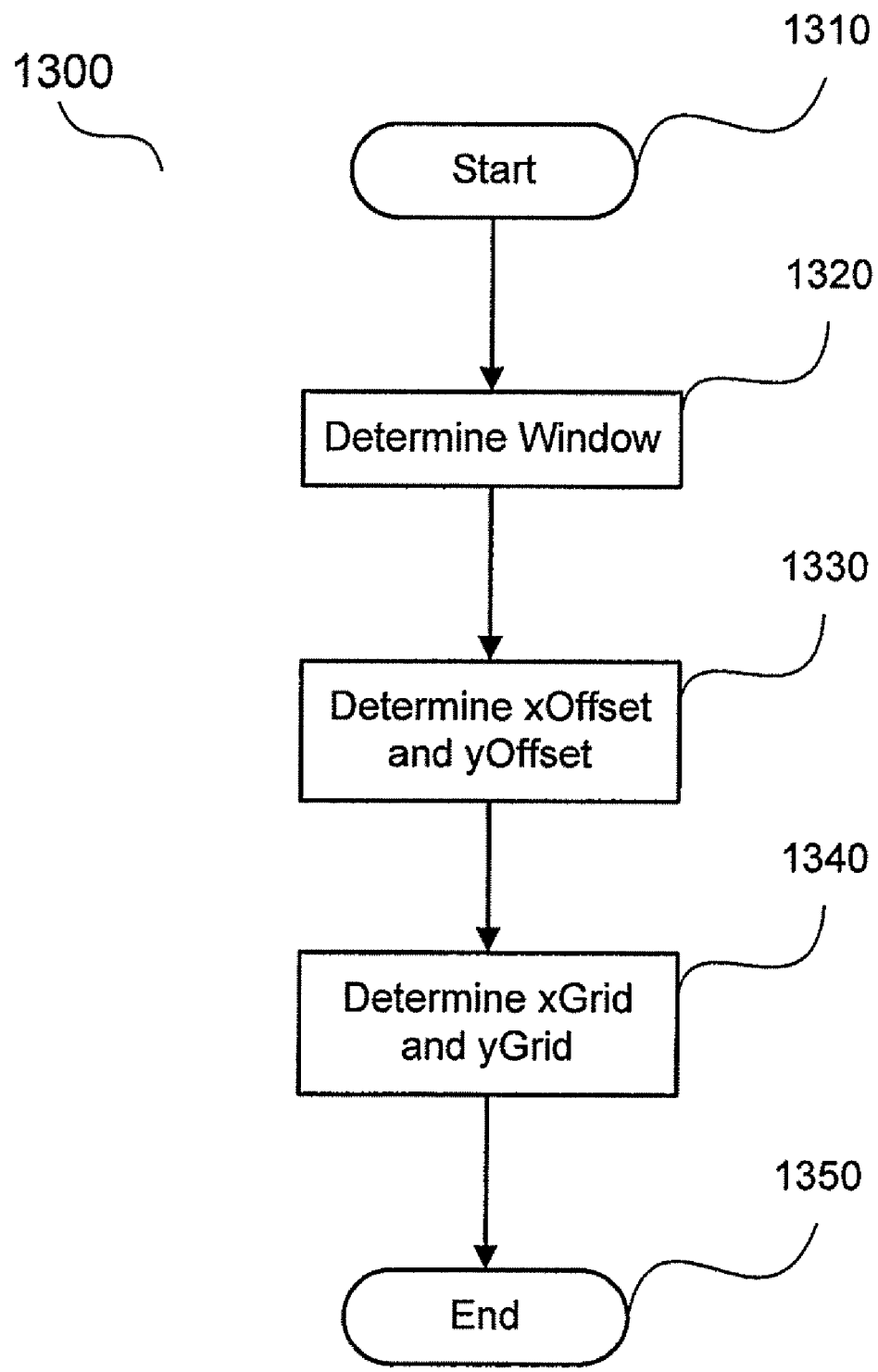
FIG. 13 is a flowchart showing the steps for grid-fitting.

FIG. 13 shows a process 1300 for computing the grid-intersection using the precomputed information. Suppose the closest grid-intersection is sought at a point $(x_c, y_c)$. The method 1300 has an entry step 1310 and substantively commences at step 1320, where a window around the point $(x_c, y_c)$ is determined. The window preferably has a size of 4×4 phasor bins, but other window sizes could be used. The window is determined to be the set of 4×4 phasor bins that have the point $(x_c, y_c)$ closest to the centre. Second, at step 1330, the values of xOffset and yOffset are determined. xOffset is the sum of the x-phasor sums of the 4×4 phasor bins in the window. Similarly, yOffset is the sum of the y-phasor sums of the 4×4 phasor bins in the window.

Finally, step 1340 estimates the location of the closest grid-intersection. Denote the current pixel location by $(x_c, y_c)$. The estimated grid intersection (xGrid, yGrid) is given by $$\begin{pmatrix} xr_c \\ yr_c \end{pmatrix} = \frac{2\pi}{gridSpacing} \begin{pmatrix} \cos\theta & \sin\theta \\ -\sin\theta & \cos\theta \end{pmatrix} \begin{pmatrix} x_c \\ y_c \end{pmatrix}$$

$$xOffset_2 = xOffset(\cos(-xr_c) + j\sin(-xr_c))$$

$$yOffset_2 = yOffset(\cos(-yr_c) + j\sin(-yr_c))$$

$$\begin{pmatrix} xGrid \\ yGrid \end{pmatrix} = \frac{gridSpacing}{2\pi} \begin{pmatrix} \cos\theta & -\sin\theta \\ \sin\theta & \cos\theta \end{pmatrix} \begin{pmatrix} xr_c + L(xOffset_2) \\ yr_c + L(yOffset_2) \end{pmatrix}$$

where $\theta$ is the grid orientation detected in step 910.

After step 1340, the method 1300 concludes.

4. LDD Decoding

Figure 16:
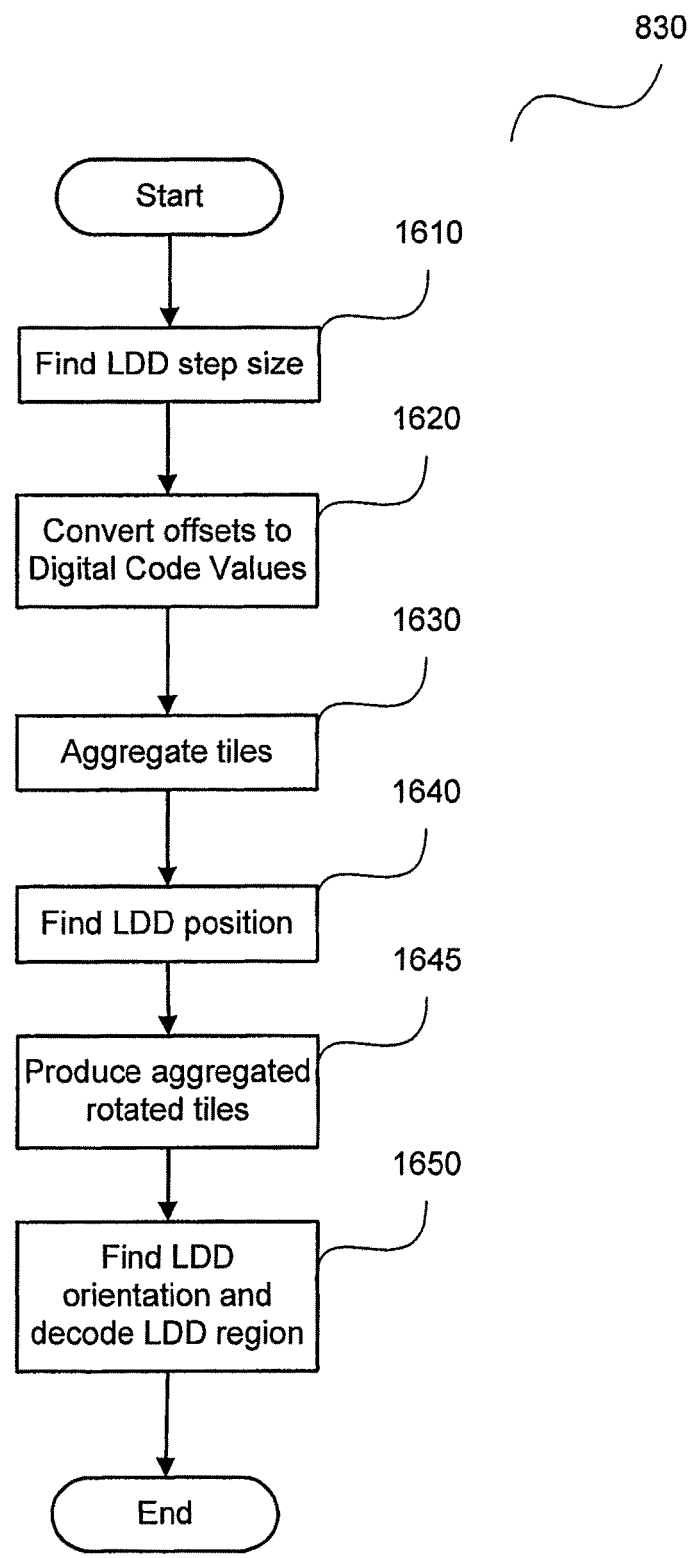
FIG. 16 is a flowchart showing the steps to decode the low data density message.

FIG. 16 depicts the step 830 in FIG. 8 in greater detail. FIG. 16 shows a method for decoding the LDD message in a barcode. The process 830 commences at a step 1610 which determines the LDD step size. In order to do this, a calculation similar to autocorrelation is performed on the offset vectors calculated in step 950. This consists of calculating a match value for each possible step offset. The step offset values range from the minimum LDD step size to the maximum LDD step size predetermined by the encoder. When the step offset is equal to the LDD step size, the match value will be large.

Figure 17:
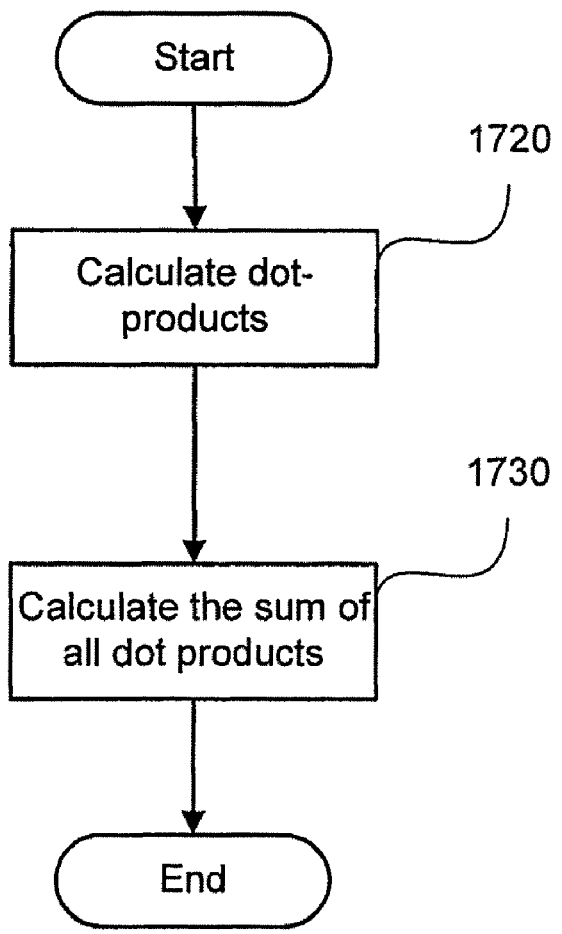
FIG. 17 is a flowchart showing the steps of calculating the match value for a given low data density step size or high data density tile size.

In the first arrangement, a method for calculating a match value at a given step offset is depicted in FIG. 17. Other autocorrelation calculations can also be used to calculate the match value. The step offset is the input to the method in FIG. 17, where the step offset is an offset value. Processing commences at a step 1720, which determines dot-products as now described.

The dot-product of two vectors (x1, y1) and (x2, y2) is given by the following:

$$(x1 \times x2) + (y1 \times y2)$$

That is, the value of the dot-product is the sum of the product of the x-components and the product of the y-components of the two vectors. The dot-product of two vectors is a scalar.

In the step 1720, a number of dot-products are calculated. Firstly, at each grid-intersection in the barcode, the dot-product of (a) the offset vector at the grid-intersection and (b) the offset vector at the grid-intersection after being displaced to the right by 'step offset' grid-points is determined. If there is no offset vector which is displaced 'step offset' grid-points to the right, a dot-product is not calculated.

Next, a step 1730 calculates the sum of all the dot products calculated in the step 1720. The sum calculated in step 1730 is the match value for the input step offset.

Figure 18:
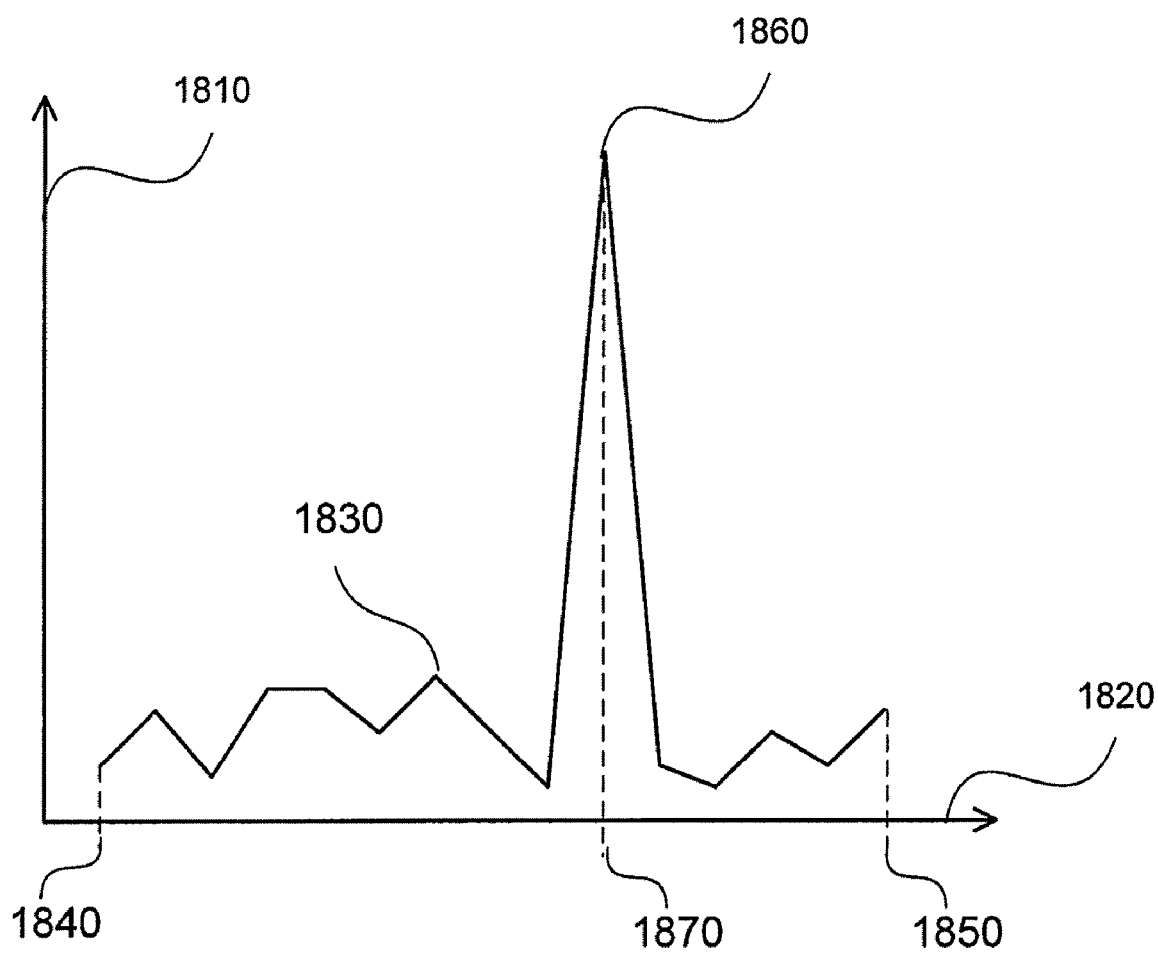
FIG. 18 shows an example of the match value graph when finding the low data density step size.

FIG. 18 depicts a match value graph used for finding the LDD step size of an example barcode. The axis 1820 is the step offset axis, the axis 1810 is the match value axis, and the curve 1830 is the plot of match value against step offset. From the graph, a point 1840 depicts the minimum LDD step size used by the encoder and a point 1850 depicts the maximum LDD step size used by the encoder. In the first arrangement, 1840 is 16 and 1850 is 30 grid squares as defined by the bounds discussed previously. The peak at 1860 corresponds to a step offset depicted by 1870. Thus, 1870 is the LDD step size of the example barcode.

Returning to FIG. 16, once the LDD step size has been calculated in the step 1610, a following step 1620 converts the dot offset vectors into digital code values. In order to convert each offset vector into its corresponding digital code values, a region around each intersection point is divided into eight equally sized angular sectors as shown in FIG. 19.

Figure 19:
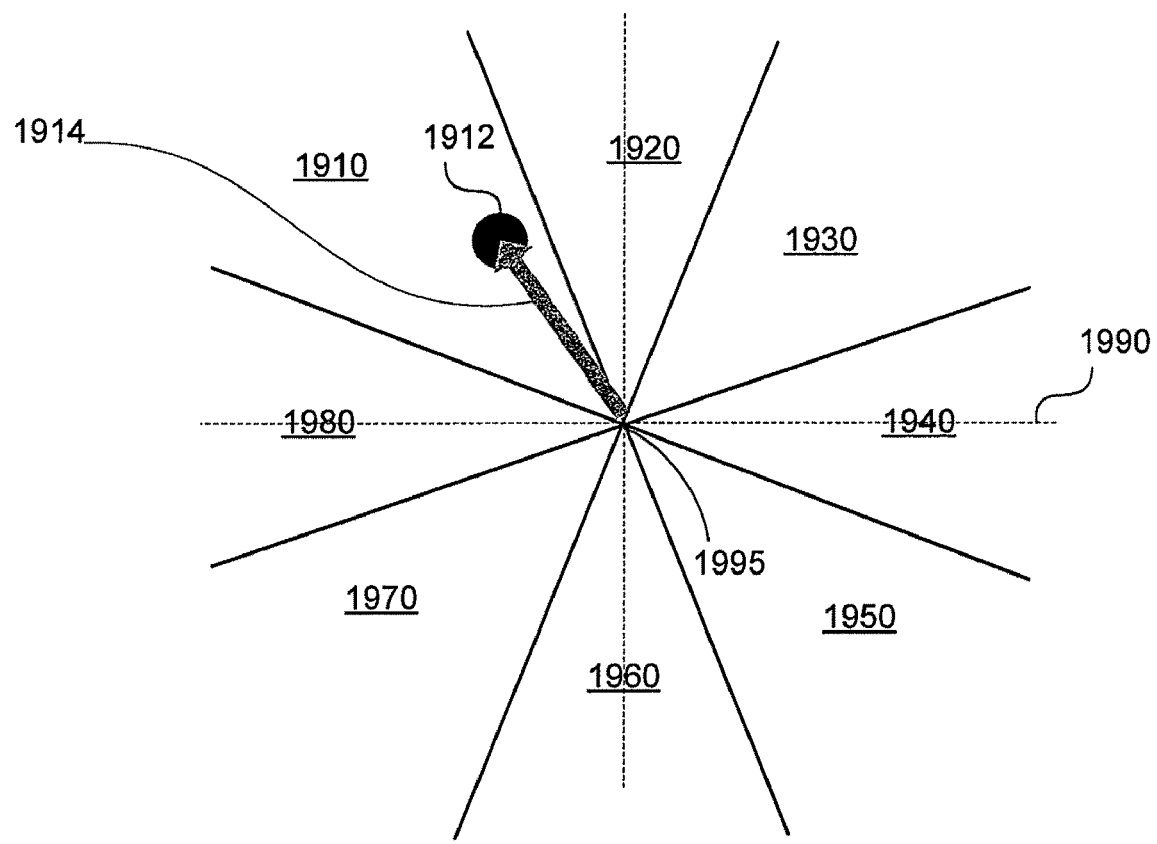
FIG. 19 illustrates the conversion of a dot offset vector to its interval value.

FIG. 19 depicts how a grid 1990, having a grid intersection 1995, can be resolved into eight angular sectors, where each sector represents an interval value. An offset vector 1914, which characterises a dot 1912, falls into a sector 1910. Referring to FIG. 4, the sector 1910 corresponds to the modulation position 401, which corresponds to the digital code value depicted by 403, which has an actual value of 5. Similarly, offset vectors that fall in sectors 1920, 1930, 1940, 1950, 1960, 1970 or 1980 respectively correspond to values 7, 6, 2, 3, 1, 0 or 4 respectively.

Returning to FIG. 16, a following step 1630 divides the barcode into regions of size 'LDD step size' by 'LDD step size' and aggregates these regions together. In order to aggregate the regions together, firstly, each digital code value is converted into its 3 bit representation. Next, the regions are merged into one aggregated region by combining the corresponding bits in the corresponding digital code values in each region. This is done by maintaining an aggregated bit count for each bit position of the digital code values in the region. An aggregated hit count is maintained for each of the three bits in the digital code values at each position in the aggregated tile. The aggregated bit count is equal to the total number of times that the bit in the digital code values at that bit position is 1, minus the total number of times that the bit in the digital code values at that bit position is 0. For example, if the digital code values at a corresponding position in four regions were 001, 101, 111, and 101 then the aggregated bit counts would be 2, −2, and 4 corresponding to the three bit positions.

Figure 20:
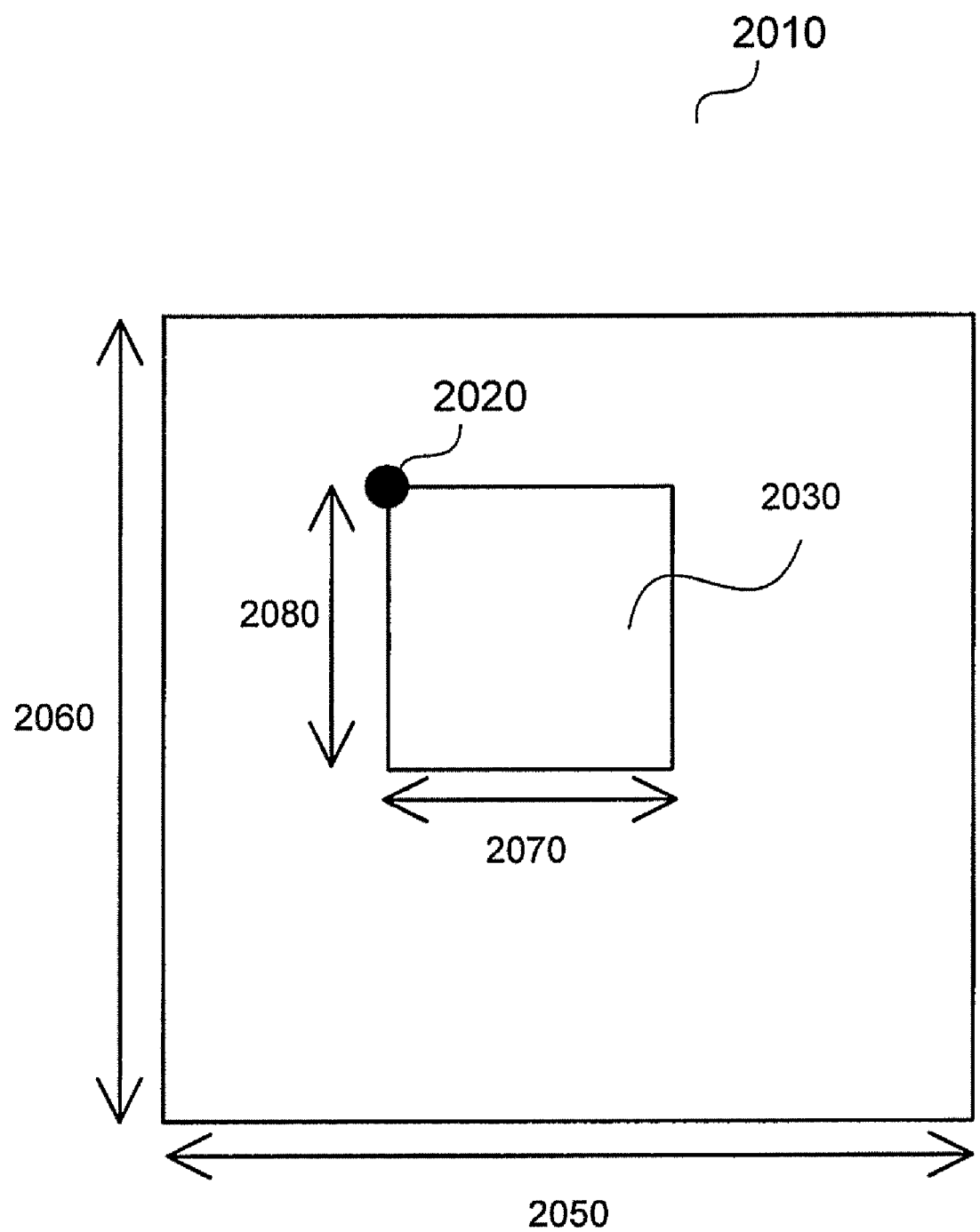
FIG. 20 illustrates an aggregated region for finding the low data density location.

FIG. 20 shows an example of an aggregated region 2010 with dimensions 2050 by 2060. The LDD step size is characterised by the dimensions 2050 and 2060.

Returning to FIG. 16, a following step 1640 finds the position of the LDD tile using the aggregated region obtained in the step 1630. The barcode consists of many copies of LDD tiles, which repeat with a period of 'LDD step size'. By aggregating regions of length 'LDD step size' together, the sub-region within each region of the aggregated region that are similar, corresponds to the LDD tile. Other sub-regions that are not as similar correspond to regions of the barcode that contain the HDD tile. In other words, the bit positions with a large positive or large negative value for their aggregated bit count indicate the bit positions that are most similar. Bit positions with a low aggregated bit count are not as similar. Thus, for each possible location of the LDD tile, the sum of the absolute value of the aggregated bit count of an LDD tile size region in the aggregated region is calculated. The location with the maximum sum is the location of the LDD tile.

Referring to FIG. 20, there will be an LDD tile 2030 (of fixed size depicted by reference numerals 2080 by 2070, which is the LDD tile size) that contains digital code values that agree within the aggregated regions. That is, the sum of the absolute value of the aggregated bit count of an LDD tile size region with top-left corner at 2020 is the maximum sum. Thus, the top-left corner of the LDD is 2020.

Once the LDD position has been found, the aggregated tile is cropped to discard the HDD data. All further steps in the process 830 in FIG. 16 relate only to the cropped aggregated tile, which contains only the LDD tile.

At a following step 1645, the aggregated tile is rotated by 0, 90, 180 and 270 degrees—representing the four possible orientations. The method for rotating the aggregated tile is now discussed in detail. Firstly, the aggregated bit counts are moved to their post rotation positions. This is illustrated in FIG. 21.

Figure 21:
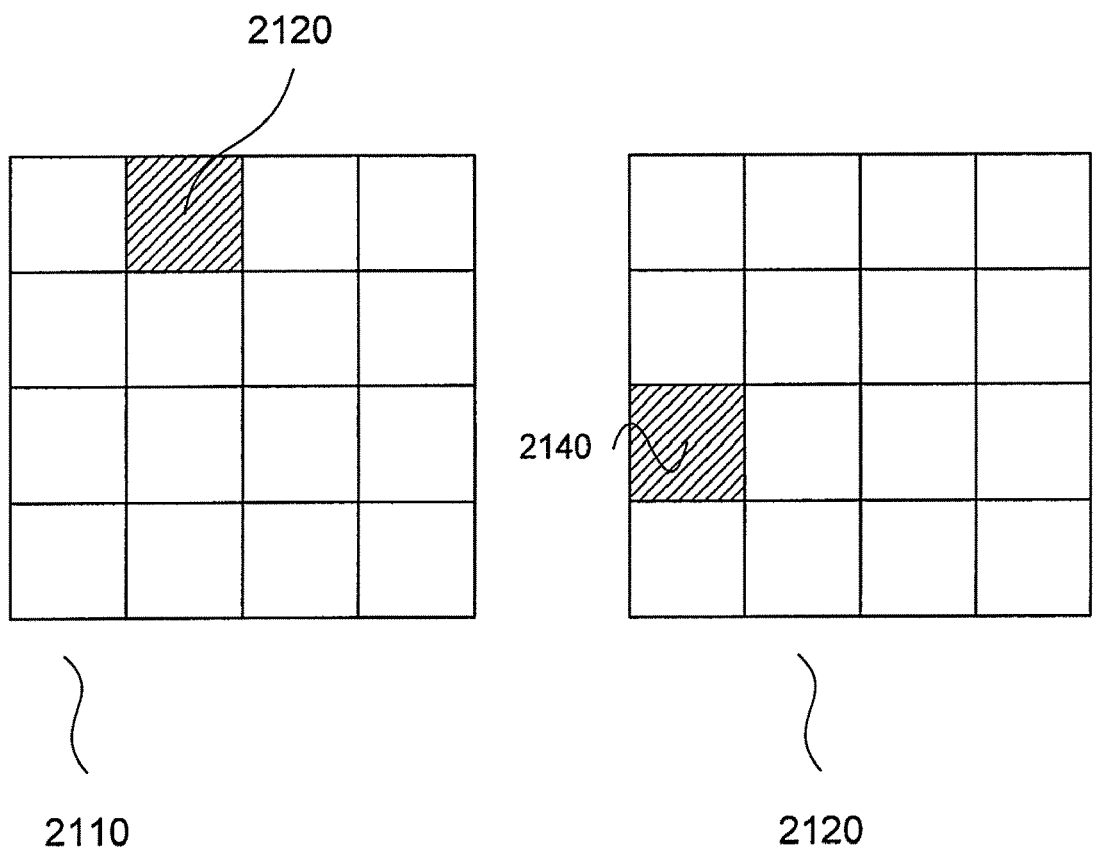
FIG. 21 illustrates the 90 degrees anti-clockwise rotation of aggregated bit counts.

FIG. 21 depicts 2110 which is the unrotated aggregated tile, and 2120, which is the aggregated tile after an anti-clockwise rotation of 90 degrees. The aggregate bit counts at 2120 are moved to 2140.

Second, the values of the aggregated bit counts are modified to represent their post rotation values. As described above, in one arrangement gray encoding is used to encode the LDD and HDD message. The list below shows the effect of rotating the 3 bit values anti-clockwise by 90 degrees (where the bits are listed from most significant bit to least significant bit):

000→011
001→010
011→110
010→111
110→101
111→100
101→000
100→001

For example, when 110 (i.e. digital code value "6") is rotated by 90 degrees, its new value is 101 (i.e. digital code value "5"). Thus, by grouping the aggregated bit counts in groups of 3 to correspond to their 3 bit grey code, the aggregated bit counts can be rotated as follows:

agg_bit_count'$_0$=−agg_bit_count$_0$
agg_bit_count'$_1$=−agg_bit_count$_2$
agg_bit_count'$_2$=agg_bit_count$_1$ where:
agg_bit_count$_0$ is the aggregated bit count for the least significant bit (i.e. the $0^{th}$ bit) of an interval;
agg_bit_count$_1$ is the aggregated bit count for the $1^{st}$ bit of an interval;
agg_bit_count$_2$ is the aggregated bit count for the most significant bit (i.e. the $2^{nd}$ bit) of an interval; and
the primed values are the new agg_bit_count values.

Thus, to rotate the aggregated bit counts by 180 degrees, the above equation is applied to the original aggregated bit counts twice. Similarly, to rotate the aggregated bit counts by 270 degrees, the above equation is applies to the original aggregated bit counts three times.

Once the four rotated aggregated tiles are produced, a following step 1650 determines the correct LDD orientation and decodes the LDD message. The LDD orientation determined at the step 1650 is different from the orientation calculated in the step 910 of FIG. 9. The orientation at the step 910 is within the range of 0 degrees to 90 degrees. However, the LDD orientation in step 1650 in FIG. 16 is the 0, 90, 180 or 270 degree orientation of the dot pattern relative to the grid.

At the step 1650, for each orientation, the possible encoded LDD message is determined. Specifically, if the (rotated) aggregated bit count for a given bit position is positive, the bit value is 1. Otherwise, the bit value is 0. Only one of the orientations will produce a sensible decoded message. This can be determined by the user.

Alternatively, at the step 1650, if an iterative ECC decoding algorithm is used (e.g. LDPC or Turbo code decoding), the LDD orientation is determined by performing one iteration of ECC decoding for all four orientations of the LDD tile. The orientation with the least errors is the correct orientation. In the first arrangement, where LDPC is used for ECC encoding, the aggregated bit counts calculated at the step 1645 are used to calculate the likelihood for each bit position. These likelihood values are used by LDPC decoding. The likelihood for each bit position is calculated as follows:

$$\text{likelihood} = \text{base}^{agg\_bit\_count}$$

where:
base is a constant value (for example, the value of base may be 2); and
agg_bit_count is the aggregated bit count for the given bit position.

Due to the properties of LDPC, the correct orientation of the LDD tile is the one with the most number of correct parity checks. The LDD message can then be decoded using LDPC decoding for the correct orientation.

5. HDD Decoding

Figure 22:
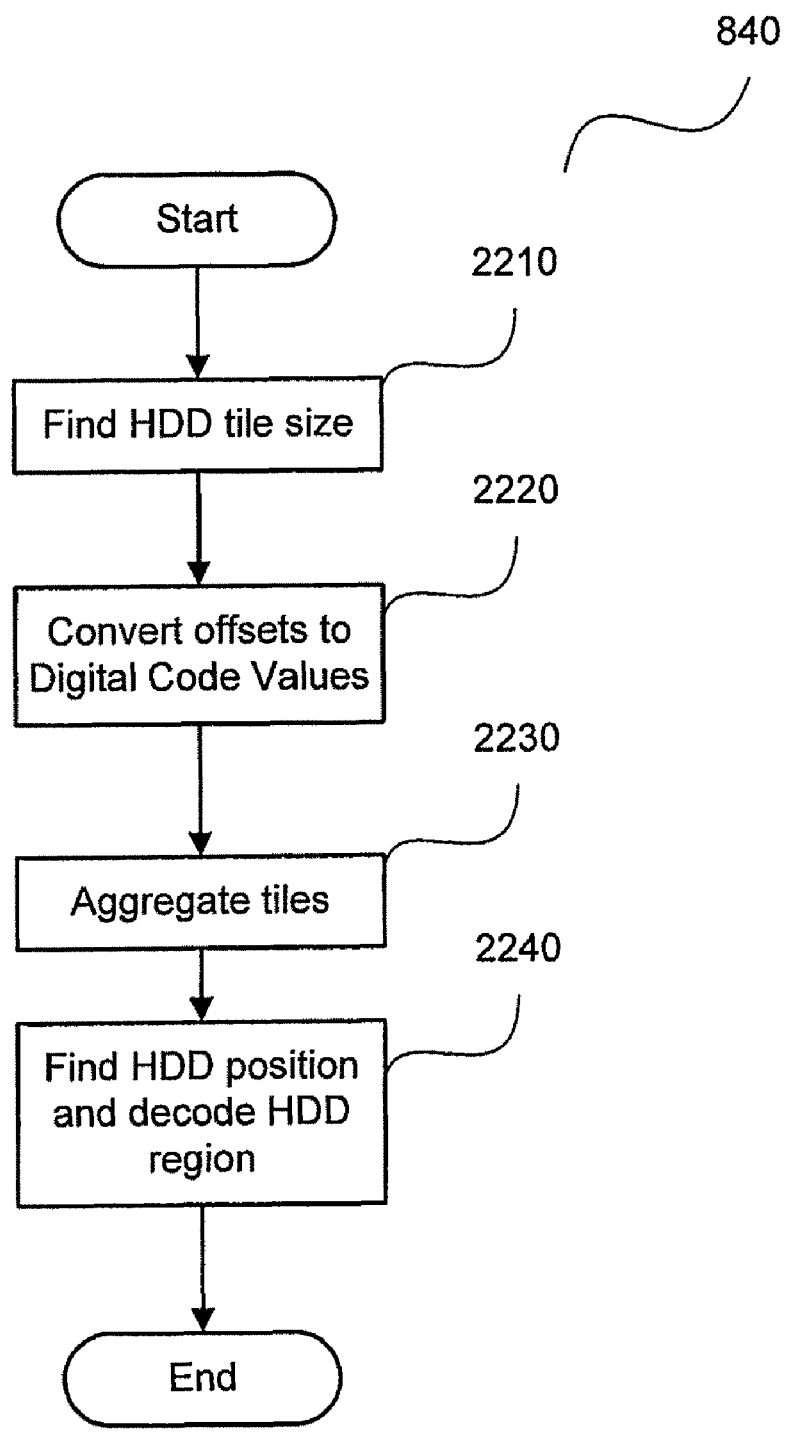
FIG. 22 is a flowchart showing the steps to decode the high data density message.

FIG. 22 depicts the step 840 (see FIG. 8) in more detail. FIG. 22 depicts a method of decoding the HDD message in an MCMME barcode. Processing commences at a step 2210 where the HDD tile size is calculated. The HDD tile size is calculated by performing an autocorrelation on the barcode, which consists of calculating a match value for different offset values. The offset values range from the minimum HDD tile size to the maximum HDD tile size as predetermined by the encoder. The offset with the largest match value is the size of the HDD tile. In the first arrangement, the method for calculating the match value at each offset value has been described in regard to the method in FIG. 17. Note that other autocorrelation calculations can also be used to calculate the match value.

Figure 23:
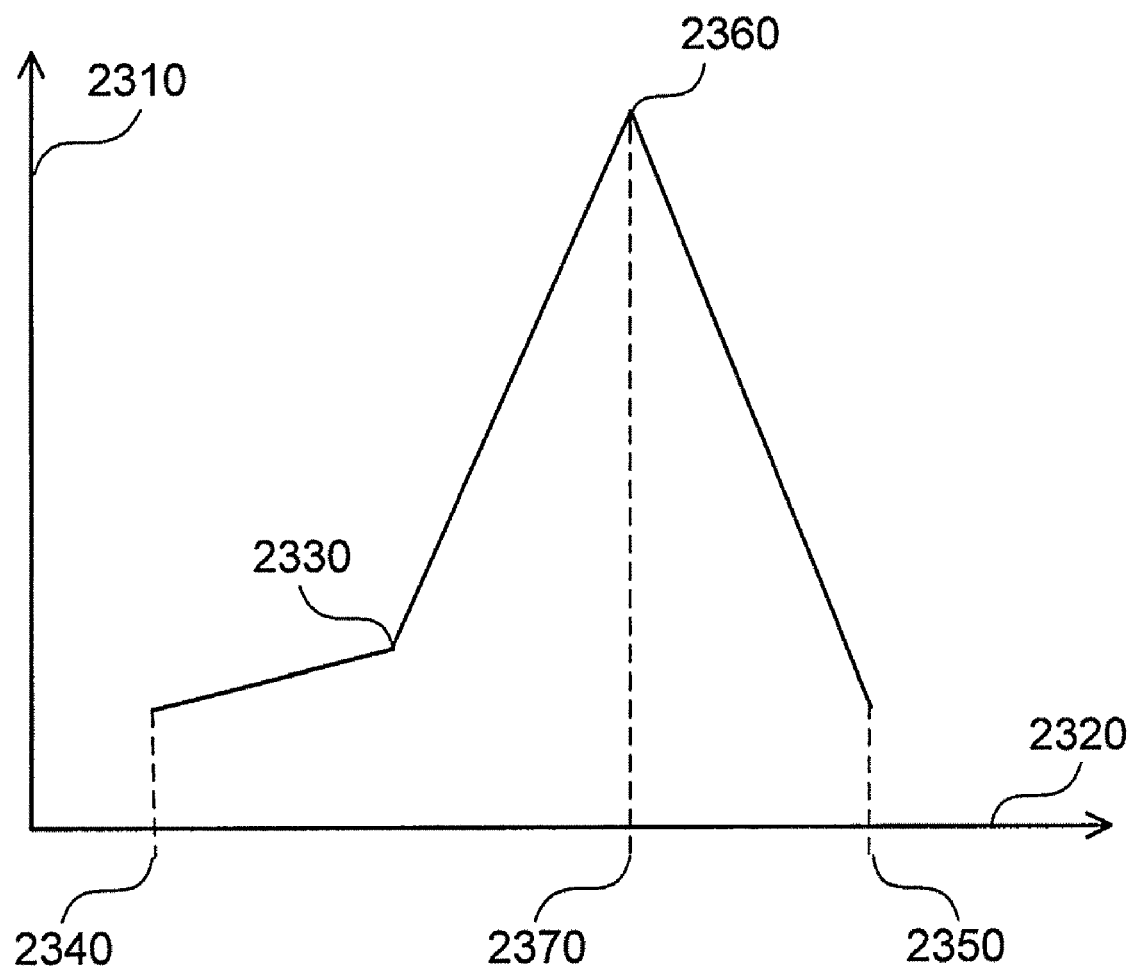
FIG. 23 shows an example of the match value graph when finding the high data density tile size.

FIG. 23 depicts the match value graph for calculating the HDD tile size. An axis 2310 represents match values, while an axis 2320 represents the different offset values. A point 2330 is a plotted match value of a given offset value. A point 2340 is the minimum HDD tile size used by the encoder and a point 2350 is the maximum HDD tile size used by the encoder. In the first arrangement, the point 2340 is 2 LDD steps and the point 2350 is 7 LDD steps. The peak value 2360, corresponding to offset value 2370, represents the HDD tile size. That is, the HDD tile size in FIG. 23 is 2370.

Returning to FIG. 22, once the HDD tile size is determined, a following step 2220 converts the offset vectors in the HDD tile to their corresponding digital code values. The step 2220 is similar to the step 1620 in FIG. 16. Next, a step 2230 aggregates the HDD tiles (using the HDD tile size identified in step 2210). The step 2230 divides the barcode image into regions of length 'HDD tile size' and aggregates these regions together. In order to aggregate the regions together, firstly, each digital code value is converted into its 3 bit representation. Next, the regions are merged into one aggregated region by combining the corresponding bits in each region. An aggregated bit count is calculated for each bit position in the HDD tile. The aggregated bit count is calculated using the same method as described in the step 1630 in FIG. 16. Additionally, the aggregated bit count is rotated using the same method as described in the step 1645 in FIG. 16, according to the orientation detected at the step 1650.

A following step 2240 then uses the aggregated HDD tiles to find the HDD position. Although the step 2210 has identified the HDD tile size, the start location of the HDD tile is still unknown.

Figure 24:
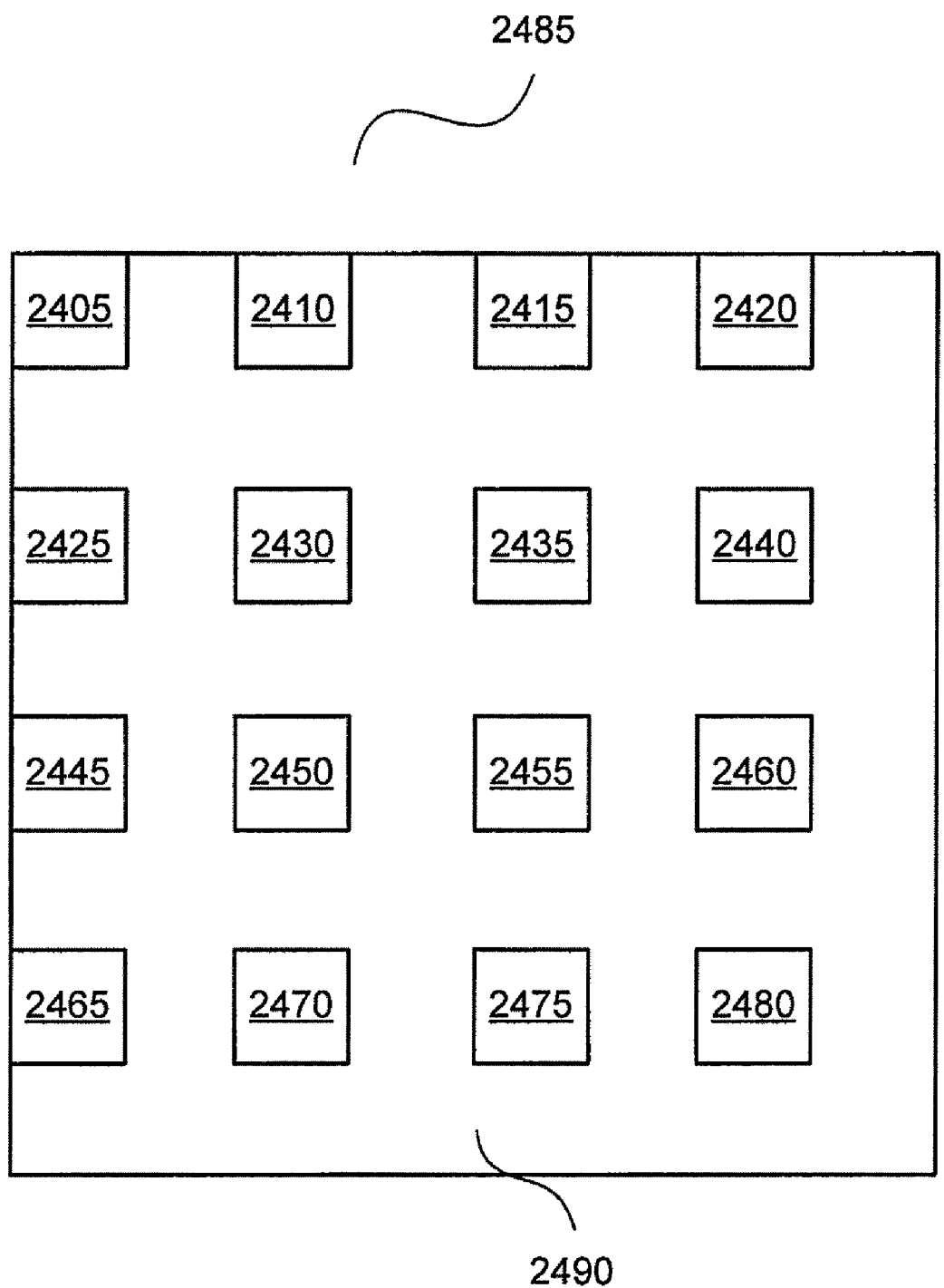
FIG. 24 illustrates an aggregated region of a high data density tile.

FIG. 24 depicts an example of an aggregated HDD tile 2485. The HDD tile 2485 is composed of LDD tiles with associated reference numbers 2405-2480, and an HDD tile referred to as 2490. The HDD tile size in FIG. 24 is 4. The start location of the HDD tile is at the start of one of LDD tiles 2405-2480 however alternative start locations are also possible. At the step 2240 in FIG. 22, if iterative ECC decoding is used, the HDD location is determined by performing one iteration of ECC decoding for all possible start locations of the HDD tile (similar to the step 1650 in FIG. 16). The start location of the HDD tile is the one with the least number of errors. The HDD message can then be decoded using ECC decoding from the correct starting location.

Alternatively, if ECC is not used, the HDD encoded bit message can be determined at all possible start locations to obtain the possible decoded messages. Specifically, using the aggregated bit count calculated at the step 2230 in FIG. 22, if the aggregated bit count for a given bit position is positive, the bit value is 1. Otherwise, the bit value is 0. Only one of the start locations will produce a sensible decoded message.

6. Extensions

Pattern Orientation

As an extension to the present MCMME arrangements, it is possible to rotate the barcode at an angle during encoding. Ideally, the angle of rotation is 45 degrees. The barcode is less visible to the human eye when the barcode is placed at an angle.

The process 810 (see FIG. 8) for decoding a barcode that has been placed at an angle during encoding remains the same as for a barcode that has not been placed at an angle. That is, the method for decoding a barcode can handle all orientations of the barcode due to the robust process 820 used for grid navigation.

Predefined LDD Step Size

In an alternate arrangement, the LDD step size can be predefined during encoding. This reduces the amount of computation required during encoding. Specifically, there are less calculations to be made during the step 710 (see FIG. 7).

During decoding, there are also less calculations to be made if the LDD step size is fixed. That is, when decoding the LDD message, the step 1610 (see FIG. 16) can be omitted. This reduces the complexity of the decoding method.

Balanced Modulation

Well balanced modulation is desirable for correct operation of the decoder (eg see FIG. 8). The process 800 shown in FIG. 8 for detecting the carrier signal (ie the grid) works best when the modulation is well balanced, and may fail if the modulation is extremely unbalanced. Most arbitrarily chosen data content will lead to reasonably well balanced modulation, but data content whose base-eight representation is extremely unevenly distributed across the base-nine digits will result in unbalanced modulation.

Well balanced modulation can be ensured by XOR-ing (binary exclusive or-ing) the message data with a well balanced fixed noise signal prior to encoding and XOR-ing with the same well balanced fixed noise signal after decoding. XOR'ing an original message twice with a fixed signal results, of course, in no net change to that original message. XOR'ing an original message once with a well balanced fixed noise signal results in a modified transmission-ready message that is well balanced, as long as the well balanced fixed noise signal is not correlated with the original message data. Avoiding significant correlation between the well balanced fixed noise signal and the original message data is readily achieved in practice by generating the well balanced fixed noise signal from an unbiased (ie balanced) random digit generator, and choosing the length of the two signals to be sufficiently long that the chance of unintended correlation is vanishingly small.

Checksum

In an alternate arrangement, a checksum (e.g. cyclic redundancy check (CRC)) can be used during encoding. A CRC is calculated against a block of data to detect errors during transmission. During encoding, a checksum can be calculated for the LDD message and the HDD message. Each checksum can be appended to their corresponding message. This step can be performed before the step 710 in FIG. 7. A checksum can be used in addition to, or in place of, ECC methods (e.g. LDPC or Reed-Solomon).

During LDD decoding, at the step 1650 (see FIG. 16), the correct LDD orientation is the orientation that produces a decoded message that matches the LDD checksum. Similarly, during HDD decoding, at the step 2240 (see FIG. 22), the correct HDD position is the position that produces a decoded message that matches the HDD checksum.

INDUSTRIAL APPLICABILITY

It is apparent from the above that the MCMME arrangements described are applicable to the computer and data processing industries.

The foregoing describes only some embodiments of the present invention, and modifications and/or changes can be made thereto without departing from the scope and spirit of the invention, the embodiments being illustrative and not restrictive.

The claims defining the invention are as follows:

1. A method of encoding information in a document using a plurality of marks, said information containing first data and second data, the method comprising the steps of:

encoding the first data using modulated marks disposed in a first plurality of tiles repeated across the document at a first repeat rate, wherein the encoding of the first data includes encoding all of the first data in each of the first plurality of tiles; and encoding the second data using modulated marks disposed in a second plurality of tiles repeated across the document at a second repeat rate, wherein the encoding of the second data includes encoding all of the second data in each of the second plurality of tiles, and wherein the second repeat rate is different than the first repeat rate and two or more of the second plurality of tiles are embedded within each of the first plurality of tiles.

2. The method of claim 1, wherein:

the step of encoding the first data comprises spatially displacing one or more marks in the first plurality of tiles from their nominal positions dependent upon the first data; and the step of encoding the second data comprises spatially displacing one or more marks in the second plurality of tiles from their nominal positions dependent upon the second data.

3. The method of claim 2, wherein:

the nominal positions of the marks in the first plurality of tiles and the nominal positions of the marks in the second plurality of tiles are the grid intersection points of a regular square grid.

4. The method of decoding information which has been encoded in a document using the method of claim 1, decoding method comprising the steps of:

determining, using the first repeat rate, the position of a grid whose grid intersection points represent the nominal positions of the marks encoding the first data;

determining, using the second repeat rate, the position of a grid whose grid intersection points represent the nominal positions of the marks encoding the second data; and demodulating the marks encoding the first data and the marks encoding the second data to thereby recover the information.

5. An apparatus for encoding information in a document using a plurality of marks, said information comprising first data and second data, said apparatus comprising:

a memory for storing a program; and a processor for executing the program, said program including:

code for encoding the first data using modulated marks disposed in a first plurality of tiles repeated across the document at a first repeat rate, wherein the encoding of the first data comprises encoding all of the first data in each of the plurality of tiles; and code for encoding the second data using modulated marks disposed in a second plurality of tiles repeated across the document at a second repeat rate, wherein the encoding of the second data includes encoding all of the second data in each of the second plurality of tiles, and wherein the second repeat rate is different than the first repeat rate and two or more of the second plurality of tiles are embedded within each of the first plurality of tiles.

6. An apparatus for decoding information which has been encoded in a document using the apparatus of claim 5, said apparatus for decoding comprising:

a memory for storing a program; and a processor for executing the program, said program comprising:

code for determining, using the first repeat rate, the position of a grid whose grid intersection points represent the nominal positions of the marks encoding the first data;

code for determining, using the second repeat rate, the position of a grid whose grid intersection points represent the nominal positions of the marks encoding the second data; and code for demodulating the marks encoding the first data and the marks encoding the second data to thereby recover the information.

7. A non-transitory computer-readable storage medium having recorded thereon a computer program for directing a processor to execute a method for encoding information in a document using a plurality of marks, said information comprising first data and second data, said program comprising:

code for encoding the first data using a modulated marks disposed in a first plurality of tiles repeated across the document at a first repeat rate, wherein the encoding of the first data comprises encoding all of the first data in each of the plurality of tiles; and code for encoding the second data using modulated marks disposed in a second plurality of tiles repeated across the document at a second repeat rate, wherein the encoding of the second data includes encoding all of the second data in each of the second plurality of tiles, and wherein the second repeat rate is different than the first repeat rate and two or more of the second plurality of tiles are embedded within each of the first plurality of tiles.

8. A non-transitory computer-readable storage medium for directing a processor to execute a method for decoding information encoded in a document using a processor executing a method according to the computer readable medium of claim 7, said program for decoding, comprising:

code for determining, using the first repeat rate, the position of a grid whose grid intersection points represent the nominal positions of the marks encoding the first data;

code for determining, using the second repeat rate, the position of a grid whose grid intersection points represent the nominal positions of the marks encoding the second data; and code for demodulating the marks encoding the first data and the marks encoding the second data to thereby recover the information.

* * * * *